(12) United States Patent
Wang et al.

(10) Patent No.: US 12,238,757 B2
(45) Date of Patent: Feb. 25, 2025

(54) DISCONTINUOUS RECEPTION ALIGNMENT WITH RESPECT TO PRIORITIZATION

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 17/659,243

(22) Filed: Apr. 14, 2022

(65) Prior Publication Data

US 2023/0337271 A1 Oct. 19, 2023

(51) Int. Cl.
*H04W 76/28* (2018.01)
*H04W 72/566* (2023.01)

(52) U.S. Cl.
CPC ......... *H04W 72/566* (2023.01); *H04W 76/28* (2018.02)

(58) Field of Classification Search
CPC .............................. H04W 72/566; H04W 76/28
See application file for complete search history.

(56) References Cited

U.S. PATENT DOCUMENTS 10,165,617 B2 * 12/2018 Chen .................... H04W 76/28
2022/0174780 A1 6/2022 Bao et al.
2024/0015830 A1 * 1/2024 Hong ................ H04W 74/0808

FOREIGN PATENT DOCUMENTS

| EP | 4021139 A1 | 6/2022 |
| WO | WO-2021031934 A1 | 2/2021 |
| WO | WO-2021031938 A1 | 2/2021 |
| WO | WO-2021041104 A1 | 3/2021 |

OTHER PUBLICATIONS

International Search Report and Written Opinion—PCT/US2023/018504—ISA/EPO—Aug. 11, 2023.

* cited by examiner

*Primary Examiner* — Wayne H Cai
(74) *Attorney, Agent, or Firm* — Paul M. McAdams; Harrity & Harrity, LLP

(57) ABSTRACT

Various aspects of the present disclosure generally relate to wireless communication. In some aspects, a first network node (e.g., a first user equipment (UE)) may determine a first sidelink discontinuous reception (DRX) priority assigned to the first network node, wherein the sidelink DRX priority is based on one or more criteria associated with the first network node. The first network node may communicate on a sidelink channel using a first set of one or more DRX configurations based on the first sidelink DRX priority assigned to the first network node, wherein the first set of one or more DRX configurations are at least partially aligned in time with a second set of one or more DRX configurations of a second network node (e.g., a second UE) assigned a second sidelink DRX priority that is equivalent to the first sidelink DRX priority. Numerous other aspects are described.

30 Claims, 16 Drawing Sheets

DISCONTINUOUS RECEPTION ALIGNMENT WITH RESPECT TO PRIORITIZATION

INTRODUCTION

Aspects of the present disclosure generally relate to wireless communication and to techniques and apparatuses for discontinuous reception (DRX) alignment with respect to prioritization.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network node for wireless communication. The first network node may include a memory and one or more processors communicatively coupled to the memory. The one or more processors may be configured to determine a first sidelink discontinuous reception (DRX) priority assigned to the first network node, wherein the first sidelink DRX priority is based on one or more criteria associated with the first network node. The one or more processors may be configured to communicate on a sidelink channel using a first set of one or more DRX configurations based on the first sidelink DRX priority assigned to the first network node, wherein the first set of one or more DRX configurations are at least partially aligned in time with a second set of one or more DRX configurations of a second network node assigned a second sidelink DRX priority, wherein the second sidelink DRX priority is equivalent to the first sidelink DRX priority.

Some aspects described herein relate to a first network node for wireless communication. The first network node may include a memory and one or more processors communicatively coupled to the memory. The one or more processors may be configured to assign a sidelink DRX priority to a second network node, wherein the sidelink DRX priority is based on one or more criteria associated with the second network node. The one or more processors may be configured to transmit, to the second network node on an access link, information that indicates the sidelink DRX priority assigned to the second network node, wherein one or more DRX configurations that the second network node uses to communicate on a sidelink channel include an ON-duration that is based on the sidelink DRX priority.

Some aspects described herein relate to a method of wireless communication performed by a first network node. The method may include determining a first sidelink DRX priority assigned to the first network node, wherein the first sidelink DRX priority is based on one or more criteria associated with the first network node. The method may include communicating on a sidelink channel using a first set of one or more DRX configurations based on the first sidelink DRX priority assigned to the first network node, wherein the first set of one or more DRX configurations are at least partially aligned in time with a second set of one or more DRX configurations of a second network node assigned a second sidelink DRX priority, wherein the second sidelink DRX priority is equivalent to the first sidelink DRX priority.

Some aspects described herein relate to a method of wireless communication performed by a first network node. The method may include assigning a sidelink DRX priority to a second network node, wherein the sidelink DRX priority is based on one or more criteria associated with the second network node. The method may include transmitting, to the second network node on an access link, information that indicates the sidelink DRX priority assigned to the second network node, wherein one or more DRX configurations that the second network node uses to communicate on a sidelink channel include an ON-duration that is based on the sidelink DRX priority.

Some aspects described herein relate to a non-transitory computer-readable medium that stores a set of instructions for wireless communication by a first network node. The set of instructions, when executed by one or more processors of the first network node, may cause the first network node to determine a first sidelink DRX priority assigned to the first network node, wherein the first sidelink DRX priority is based on one or more criteria associated with the first network node. The set of instructions, when executed by one or more processors of the first network node, may cause the first network node to communicate on a sidelink channel using a first set of one or more DRX configurations based on the first sidelink DRX priority assigned to the first network node, wherein the first set of one or more DRX configurations are at least partially aligned in time with a second set of one or more DRX configurations of a second network node assigned a second sidelink DRX priority, wherein the second sidelink DRX priority is equivalent to the first sidelink DRX priority.

Some aspects described herein relate to a non-transitory computer-readable medium that stores a set of instructions for wireless communication by a first network node. The set of instructions, when executed by one or more processors of the first network node, may cause the first network node to assign a sidelink DRX priority to a second network node, wherein the sidelink DRX priority is based on one or more criteria associated with the second network node. The set of instructions, when executed by one or more processors of the first network node, may cause the first network node to transmit, to the second network node on an access link, information that indicates the sidelink DRX priority assigned to the second network node, wherein one or more DRX configurations that the second network node uses to communicate on a sidelink channel include an ON-duration that is based on the sidelink DRX priority.

Some aspects described herein relate to an apparatus for wireless communication. The apparatus may include means for determining a first sidelink DRX priority assigned to the apparatus, wherein the sidelink DRX priority is based on one or more criteria associated with the apparatus. The apparatus may include means for communicating on a sidelink channel using a first set of one or more DRX configurations based on the first sidelink DRX priority assigned to the apparatus, wherein the first set of one or more DRX configurations are at least partially aligned in time with a second set of one or more DRX configurations of a network node assigned a second sidelink DRX priority, wherein the second sidelink DRX priority is equivalent to the first sidelink DRX priority.

Some aspects described herein relate to an apparatus for wireless communication. The apparatus may include means for assigning a sidelink DRX priority to a network node, wherein the sidelink DRX priority is based on one or more criteria associated with the network node. The apparatus may include means for transmitting, to the network node on an access link, information that indicates the sidelink DRX priority assigned to the network node, wherein one or more DRX configurations that the network node uses to communicate on a sidelink channel include an ON-duration that is based on the sidelink DRX priority.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing broadly outlines example features and example technical advantages of examples according to the disclosure. Additional example features and example advantages are described herein.

BRIEF DESCRIPTION OF THE DRAWINGS

The drawings illustrate certain example aspects of this disclosure and are therefore not limiting in scope. The same reference numbers in different drawings may identify the same or similar elements.

DETAILED DESCRIPTION

Figure 1:
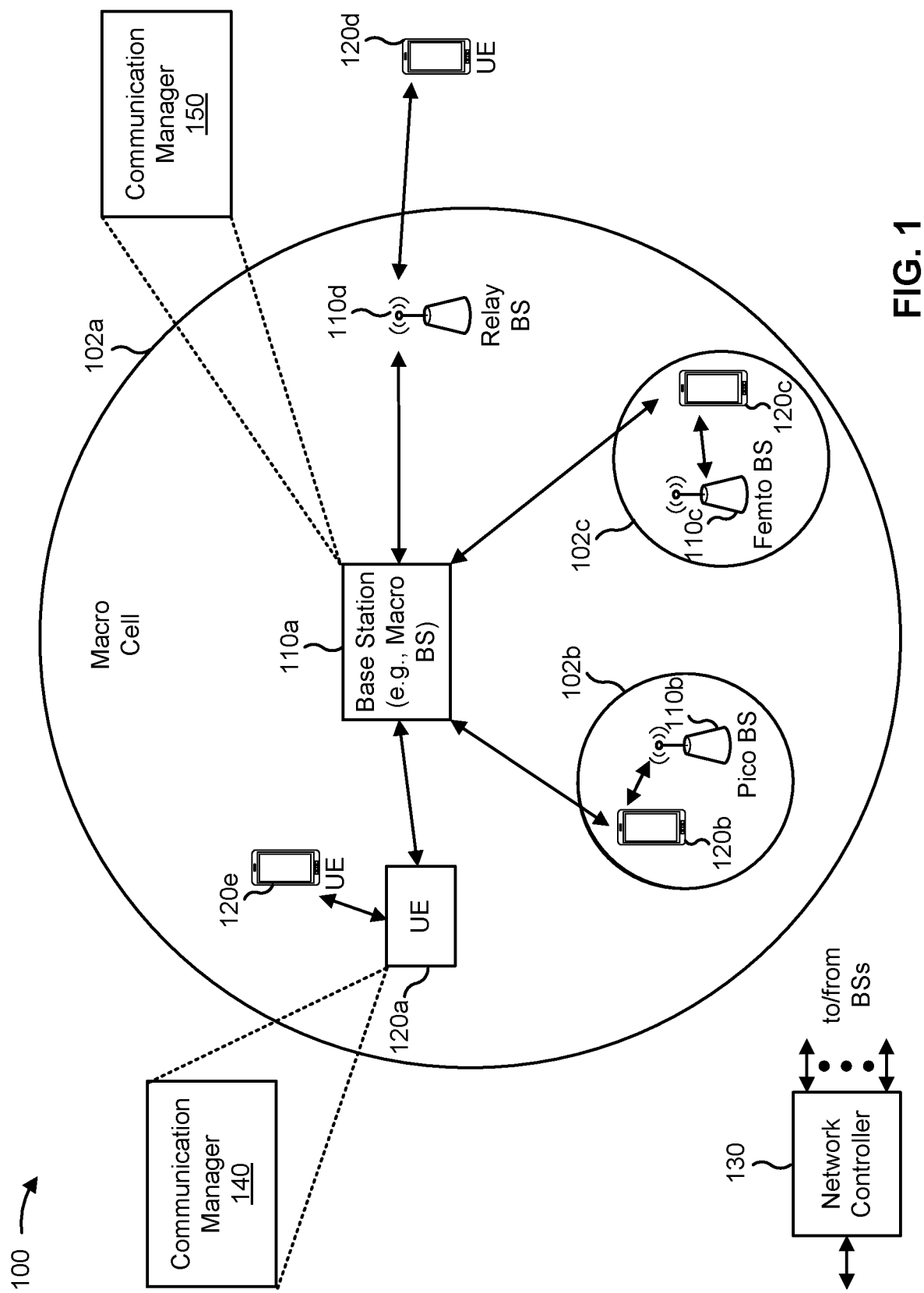
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure, function, example, aspect, or the like presented throughout this disclosure. This disclosure includes, for example, any aspect disclosed herein, whether implemented independently of or combined with any other aspect of the disclosure. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects of the disclosure set forth herein. Any aspect of the disclosure disclosed herein may be embodied by one or more elements of a claim.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chiplevel components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems are presented with reference to various apparatuses and techniques. These apparatuses and techniques are described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a base station (BS)) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first network node (e.g., a first UE 120) may include a communication manager 140. As described in more detail elsewhere herein, the communication manager 140 may determine a first sidelink discontinuous reception (DRX) priority assigned to the first network node, wherein the first sidelink DRX priority is based on one or more criteria associated with the first network node; and communicate on a sidelink channel using a first set of one or more DRX configurations based on the first sidelink DRX priority assigned to the first network node, wherein the first set of one or more DRX configurations are at least partially aligned in time with a second set of one or more DRX configurations of a second network node assigned a second sidelink DRX priority, wherein the second sidelink DRX priority is equivalent to the first sidelink DRX priority (e.g., a second UE 120) assigned an equivalent sidelink DRX priority. Additionally, or alternatively, the communication manager 140 may perform one or more other operations described herein.

In some aspects, a first network node (e.g., a base station 110) may include a communication manager 150. As described in more detail elsewhere herein, the communication manager 150 may assign a sidelink DRX priority to a second network node (e.g., a UE 120), wherein the sidelink DRX priority is based on one or more criteria associated with the second network node; and transmit, to the second network node on an access link, information that indicates the sidelink DRX priority assigned to the second network node, wherein one or more DRX configurations that the second network node uses to communicate on a sidelink channel include an ON-duration that is based on the sidelink DRX priority. Additionally, or alternatively, the communication manager 150 may perform one or more other operations described herein.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

As indicated above, FIG. 1 is provided as an example. Other examples may differ from what is described with regard to FIG. 1.

Figure 2:
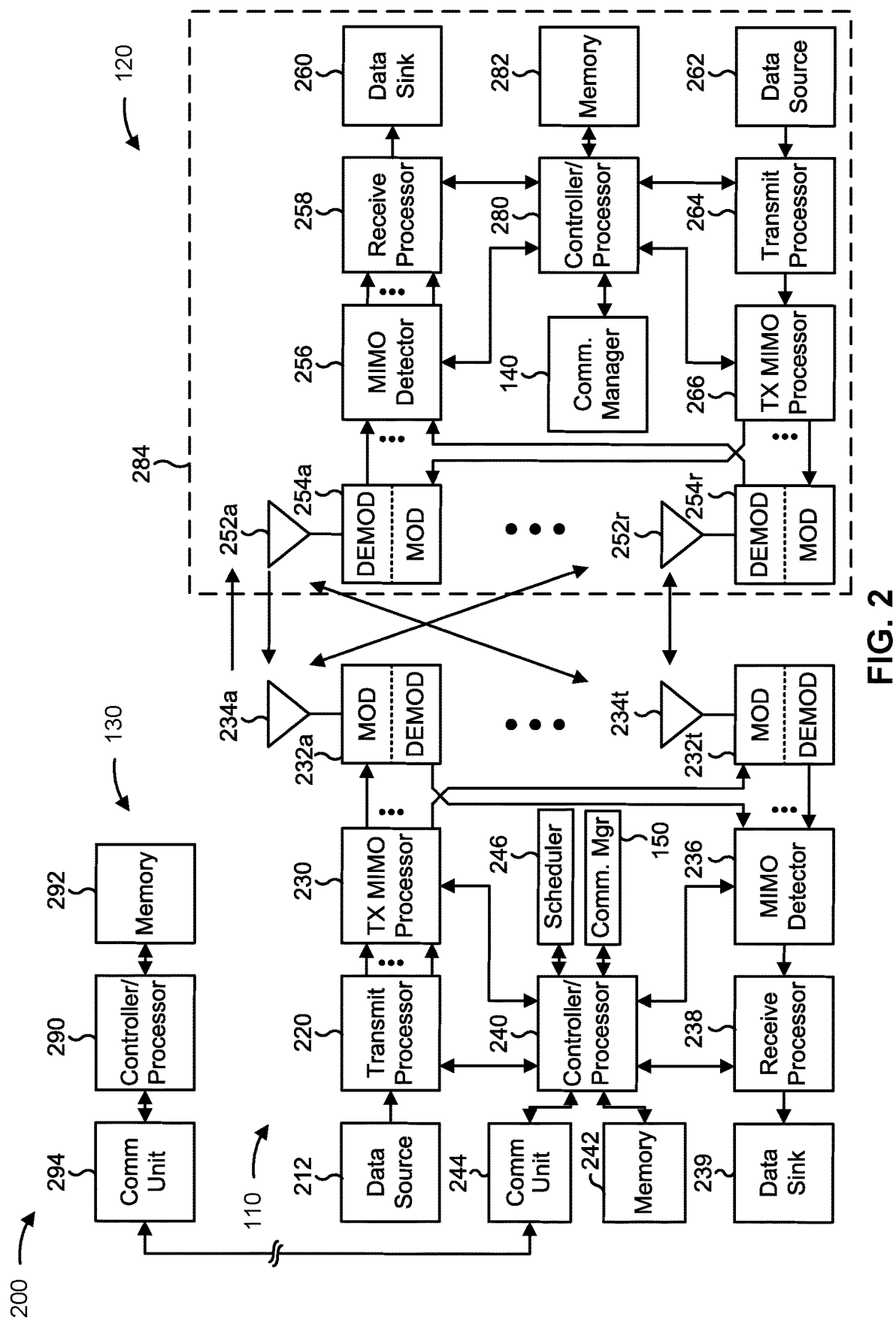
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended or otherwise destined for the UE 120 (or a set of UEs 120). The transmit processor 220 may select one or more modulation and coding schemes (MCSs) for the UE 120 based on one or more channel quality indicators (CQIs) received from that UE 120. The base station 110 may process (e.g., encode and modulate) the data for the UE 120 based on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-15).

The controller/processor 240 of the base station 110, the controller/processor 280 of the UE 120, and/or any other component(s) of FIG. 2 may perform one or more techniques associated with discontinuous reception (DRX) alignment with respect to prioritization, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a first network node (e.g., a first UE 120) includes means for determining a first sidelink DRX priority assigned to the first network node, wherein the first sidelink DRX priority is based on one or more criteria associated with the first network node; and/or means for communicating on a sidelink channel using a first set of one or more DRX configurations based on the first sidelink DRX priority assigned to the first network node, wherein the first set of one or more DRX configurations are at least partially aligned in time with a second set of one or more DRX configurations of a second network node (e.g., a second UE) assigned a second sidelink DRX priority, wherein the second sidelink DRX priority is equivalent to the first sidelink DRX priority. In some aspects, the means for the first network node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first network node (e.g., the base station 110) includes means for assigning a sidelink DRX priority to a second network node (e.g., the UE 120), wherein the sidelink DRX priority is based on one or more criteria associated with the second network node; and/or means for transmitting, to the second network node on an access link, information that indicates the sidelink DRX priority assigned to the second network node, wherein one or more DRX configurations that the second network node uses to communicate on a sidelink channel include an ON-duration that is based on the sidelink DRX priority. In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
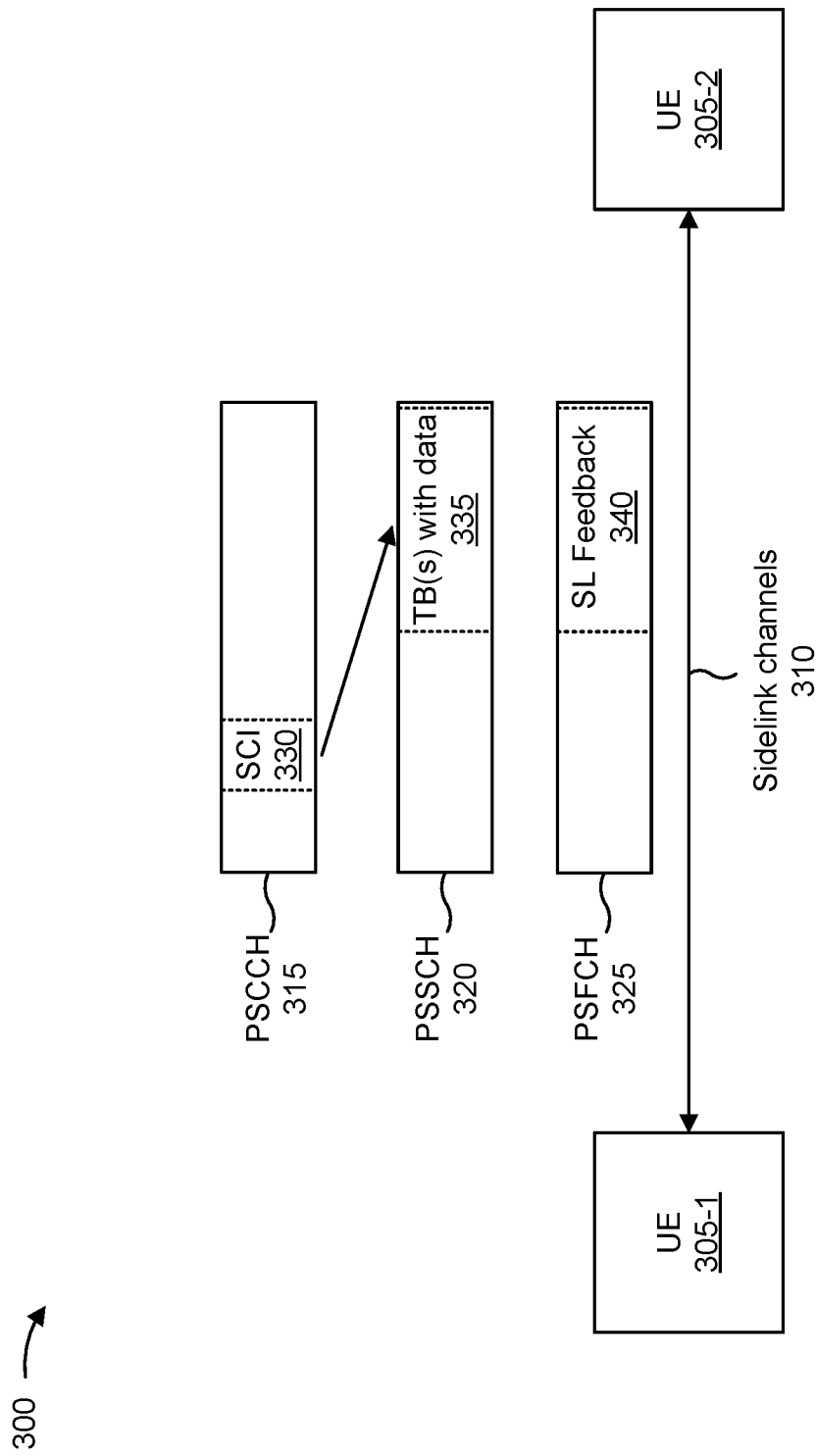
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications), and/or mesh networking, among other examples. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305 (e.g., Mode 2), the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with regard to FIG. 3.

Figure 4:
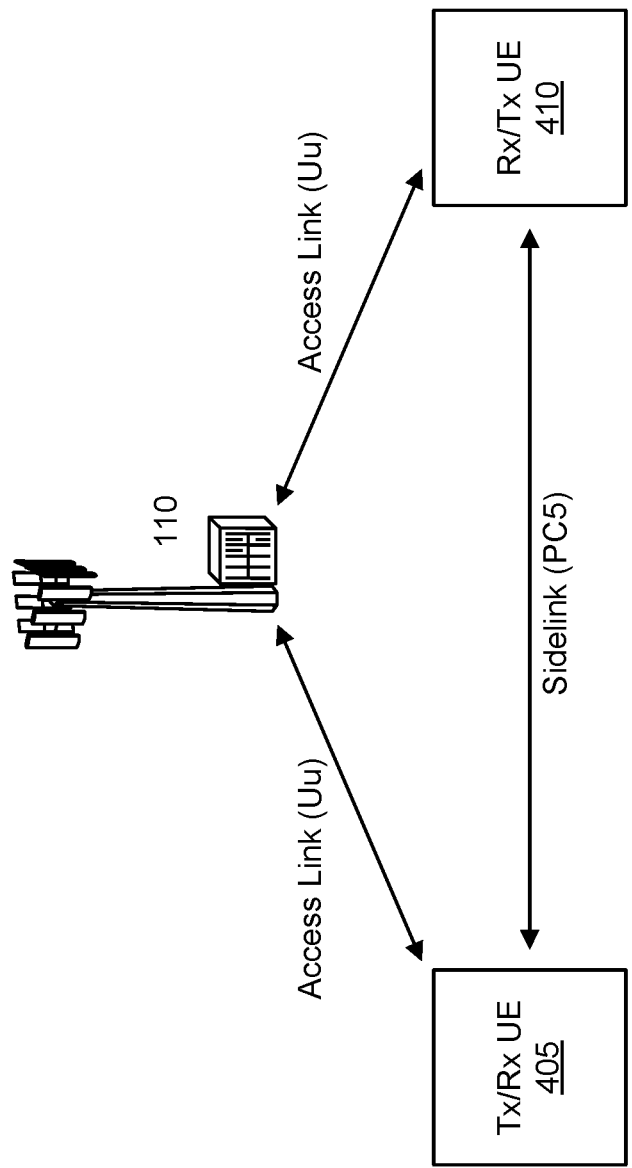
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with regard to FIG. 4.

Figure 5:
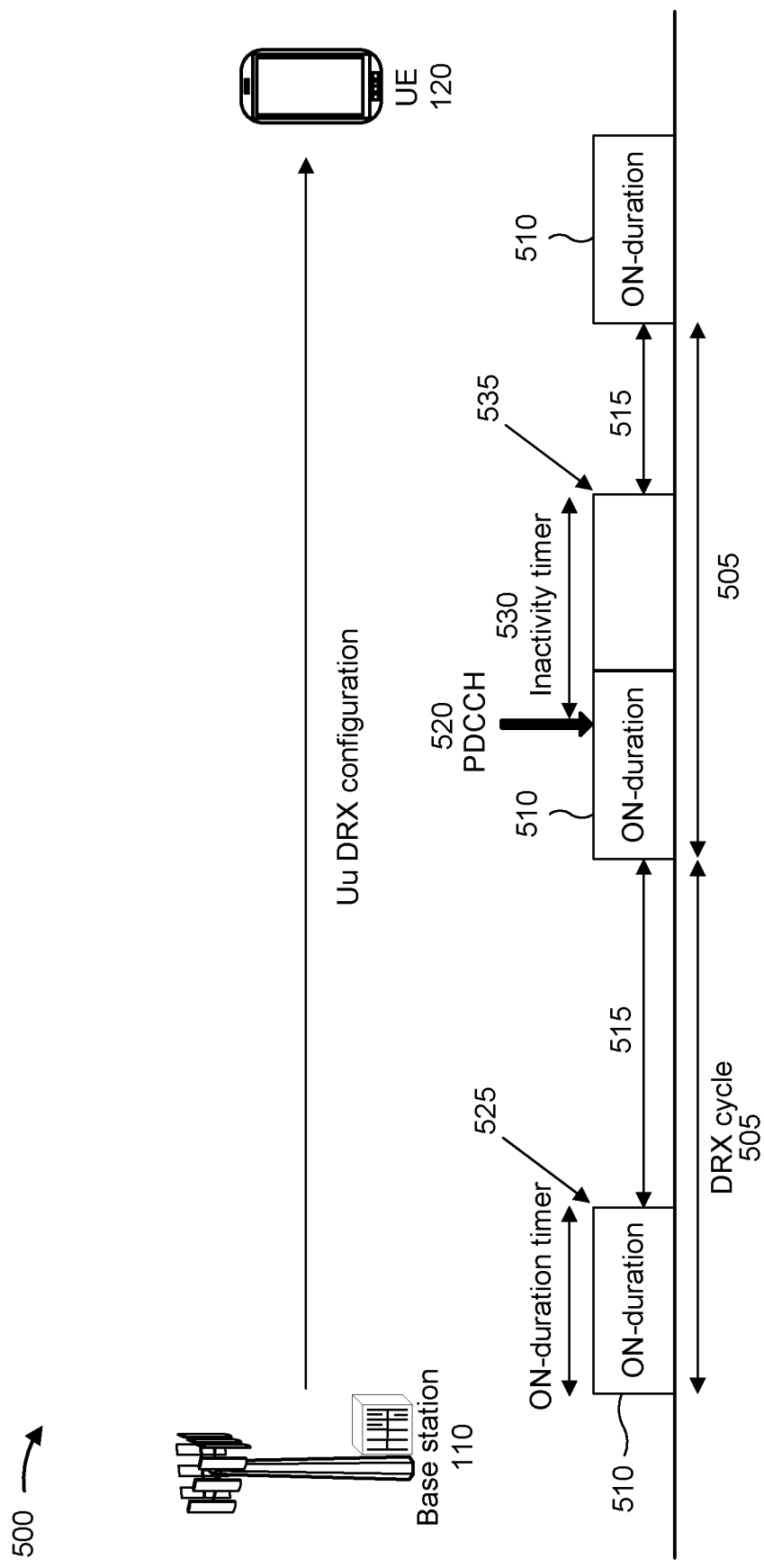
FIG. 5 is a diagram illustrating an example of an access link discontinuous reception (DRX) configuration, in accordance with the present disclosure.

FIG. 5 is a diagram illustrating an example 500 of an access link (Uu) discontinuous reception (DRX) configuration, in accordance with the present disclosure.

As shown in FIG. 5, a base station 110 may transmit a DRX configuration to a UE 120 to configure a DRX cycle 505 for the UE 120. A DRX cycle 505 may include a DRX ON-duration 510 (e.g., during which a UE 120 is awake or in an active state) and an opportunity to enter a DRX sleep state 515. As used herein, the time during which the UE 120 is configured to be in an active state during the DRX ON-duration 510 may be referred to as an active time, and the time during which the UE 120 is configured to be in the DRX sleep state 515 may be referred to as an inactive time. As described below, the UE 120 may monitor a PDCCH during the active time, and may refrain from monitoring the PDCCH during the inactive time.

During the DRX ON-duration 510 (e.g., the active time), the UE 120 may monitor a downlink control channel (e.g., a PDCCH), as shown by reference number 520. For example, the UE 120 may monitor the PDCCH for DCI pertaining to the UE 120. If the UE 120 does not detect and/or successfully decode any PDCCH communications addressed to or otherwise pertaining to the UE 120 during the DRX ON-duration 510, the UE 120 may enter the sleep state 515 (e.g., for the inactive time) at the end of the DRX ON-duration 510, as shown by reference number 525. In this way, the UE 120 may conserve battery power and reduce power consumption. As shown, the DRX cycle 505 may repeat with a configured periodicity according to the DRX configuration.

If the UE 120 detects and/or successfully decodes a PDCCH communication addressed to or otherwise pertaining to the UE 120, the UE 120 may remain in an active state (e.g., awake) for the duration of a DRX inactivity timer 530 (e.g., which may extend the active time). The UE 120 may start the DRX inactivity timer 530 at a time at which the PDCCH communication is received (e.g., in a TTI in which the PDCCH communication is received, such as a slot or a subframe). The UE 120 may remain in the active state until the DRX inactivity timer 530 expires, at which time the UE 120 may enter the sleep state 515 (e.g., for the inactive time), as shown by reference number 535. During the duration of the DRX inactivity timer 530, the UE 120 may continue to monitor for PDCCH communications, may obtain a downlink data communication (e.g., on a downlink data channel, such as a PDSCH) scheduled by the PDCCH communication, and/or may prepare and/or transmit an uplink communication (e.g., on a PUSCH) scheduled by the PDCCH communication. The UE 120 may restart the DRX inactivity timer 530 after each detection of a PDCCH communication for the UE 120 for an initial transmission (e.g., but not for a retransmission). By operating in this manner, the UE 120 may conserve battery power and reduce power consumption by entering the sleep state 515.

As indicated above, FIG. 5 is provided as an example. Other examples may differ from what is described with regard to FIG. 5.

Figure 6:
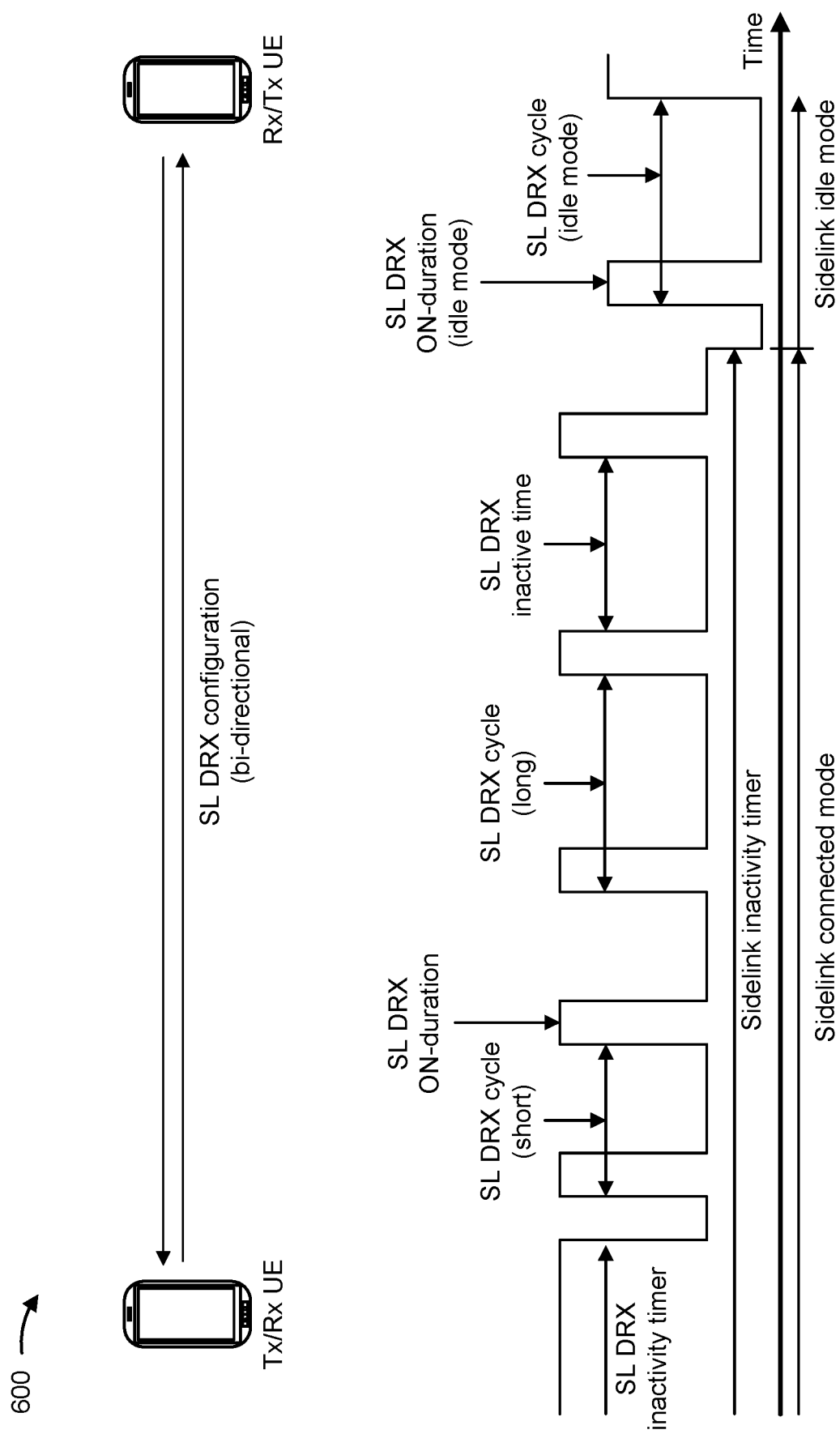
FIG. 6 is a diagram illustrating an example of a sidelink DRX configuration, in accordance with the present disclosure.

FIG. 6 is a diagram illustrating an example 600 of a sidelink DRX configuration, in accordance with the present disclosure. In some cases, as described above with reference to FIG. 5, a base station may provide a UE with a Uu DRX configuration for an access link between the UE and the base station, to conserve battery life or otherwise reduce power consumption of the UE. In general, as described herein, DRX operation may include transitioning to a DRX sleep state for a DRX sleep duration, which may be referred to as an inactive time. In the DRX sleep state, the UE may refrain from transmitting or receiving on the access link, may deactivate particular subcarriers or component carriers (e.g., if carrier aggregation is implemented on the access link) of the access link, and/or may deactivate one or more components of the UE. Moreover, DRX operation may include periodically transitioning out of the DRX sleep mode and into an activate state for a DRX ON-duration in order to monitor for downlink communications from the base station. In some cases, the base statin may transmit an instruction to the UE to perform Uu DRX operation and/or to transition to the DRX sleep state.

In some cases, a UE may be configured to communicate with another UE (or an integrated access and backhaul (IAB) node may be configured to communicate with another IAB node) over a sidelink. Accordingly, in some cases, a UE may be configured to perform DRX operation on the sidelink. For example, in FIG. 6, a Tx UE 120t may be transmitting a sidelink communication to an Rx UE, and the Tx UE may provide a sidelink DRX configuration (which may be interchangeably shown in the drawings and/or referred to herein as a PC5 DRX configuration or an SL DRX configuration) to the Rx UE. Furthermore, in sidelink communication, transmission between each UE pair is bi-directional, whereby each UE may be a Tx UE and an Rx UE. Accordingly, when the Rx UE is acting as a transmitter and the Tx UE is acting as a receiver, the Rx UE may provide a sidelink DRX configuration to the Tx UE. Other examples of configurations may be used for sidelink DRX operation of a UE and/or UE pair.

As shown in FIG. 6, a UE may perform sidelink DRX operation in various sidelink connectivity modes, such as a sidelink connected mode (e.g., an RRC connected mode on one or more sidelinks) and/or a sidelink idle mode (e.g., an RRC idle mode). In some aspects, the UE may perform sidelink DRX operation in other sidelink connectivity modes, such as a sidelink inactive mode (e.g., an RRC inactive mode on one or more sidelinks).

As further shown in FIG. 6, the UE may initiate sidelink DRX operation based on expiration of a sidelink DRX inactivity timer. In some aspects, the UE may initiate sidelink DRX operation prior to expiration of the sidelink DRX inactivity timer, such as based on expiration of a sidelink inactivity timer (e.g., which may cause the UE to transition from the sidelink connected mode to the sidelink idle mode) and/or based on operation of another UE.

In some aspects, the UE may determine whether the sidelink DRX inactivity timer has expired based on a time duration since the UE last transmitted and/or received a sidelink communication. For example, the UE may determine that the sidelink DRX inactivity timer has expired based on not transmitting and/or not receiving a sidelink communication during the time duration and/or based on transmitting and/or receiving a quantity of sidelink communications, during the time duration, that fails to satisfy a threshold.

Similarly, the UE may determine whether the sidelink inactivity timer has expired based on a time duration since the UE last transmitted and/or last received a sidelink communication. The time duration associated with the sidelink inactivity timer may be different (e.g., longer) relative to the time duration associated with the sidelink DRX inactivity timer. For example, the UE may determine that the sidelink inactivity timer has expired based on not transmitting and/or not receiving a sidelink communication during the time duration and/or based on transmitting and/or receiving a quantity of sidelink communications, during the time duration, that fails to satisfy a threshold.

As further shown in FIG. 6, the UE may perform sidelink DRX operation based on a sidelink DRX cycle. The sidelink DRX cycle may include a combination of a sidelink DRX ON-duration and a sidelink DRX sleep state. The UE may operate in the sidelink DRX sleep state for a sidelink DRX sleep duration or inactive time. In the sidelink DRX sleep state, the UE may refrain from transmitting or receiving on the sidelink, may deactivate particular subcarriers or component carriers (e.g., if carrier aggregation is implemented on the sidelink) of the sidelink, and/or may deactivate one or more components of the UE, among other examples. Moreover, the UE may operate in a sidelink DRX on mode for a sidelink DRX ON-duration to monitor for sidelink communications from other UEs and/or to transmit sidelink communications to other UEs. The combination of the sidelink DRX sleep duration and the sidelink DRX ON-duration may be referred to as the sidelink DRX cycle duration of the sidelink DRX cycle. On the other hand, a UE in a sidelink DRX sleep state may be active on an access link for uplink transmission and/or downlink reception. The UE may also use the sidelink for other purposes, such as additional measurement and/or testing.

As further shown in FIG. 6, the sidelink DRX operation of the UE may include various types of sidelink DRX cycles, such as a short sidelink DRX cycle and/or a long sidelink DRX cycle. The sidelink DRX cycle duration of the short sidelink DRX cycle may be shorter relative to the sidelink DRX cycle duration of the long sidelink DRX cycle. As an example, a short DRX cycle duration may be five (5) subframes and a long DRX cycle duration may be ten (10) subframes. In some aspects, the UE may transition from short sidelink DRX cycles to long sidelink DRX cycles based on not transmitting and/or not receiving sidelink communications in a particular quantity of consecutive sidelink DRX on mode durations.

In some aspects, the sidelink DRX cycle duration, the sidelink DRX ON-duration, and/or the sidelink DRX sleep duration of the sidelink DRX operation of the UE may be the same or different between the sidelink connected mode and the sidelink idle mode. For example, the sidelink DRX sleep mode duration may be longer in the sidelink idle mode relative to the sidelink connected mode, in which case fewer sidelink DRX ON-durations may be scheduled for a given time period in the sidelink idle mode relative to the sidelink connected mode.

As indicated above, FIG. 6 is provided as an example. Other examples may differ from what is described with regard to FIG. 6.

Figure 7A:
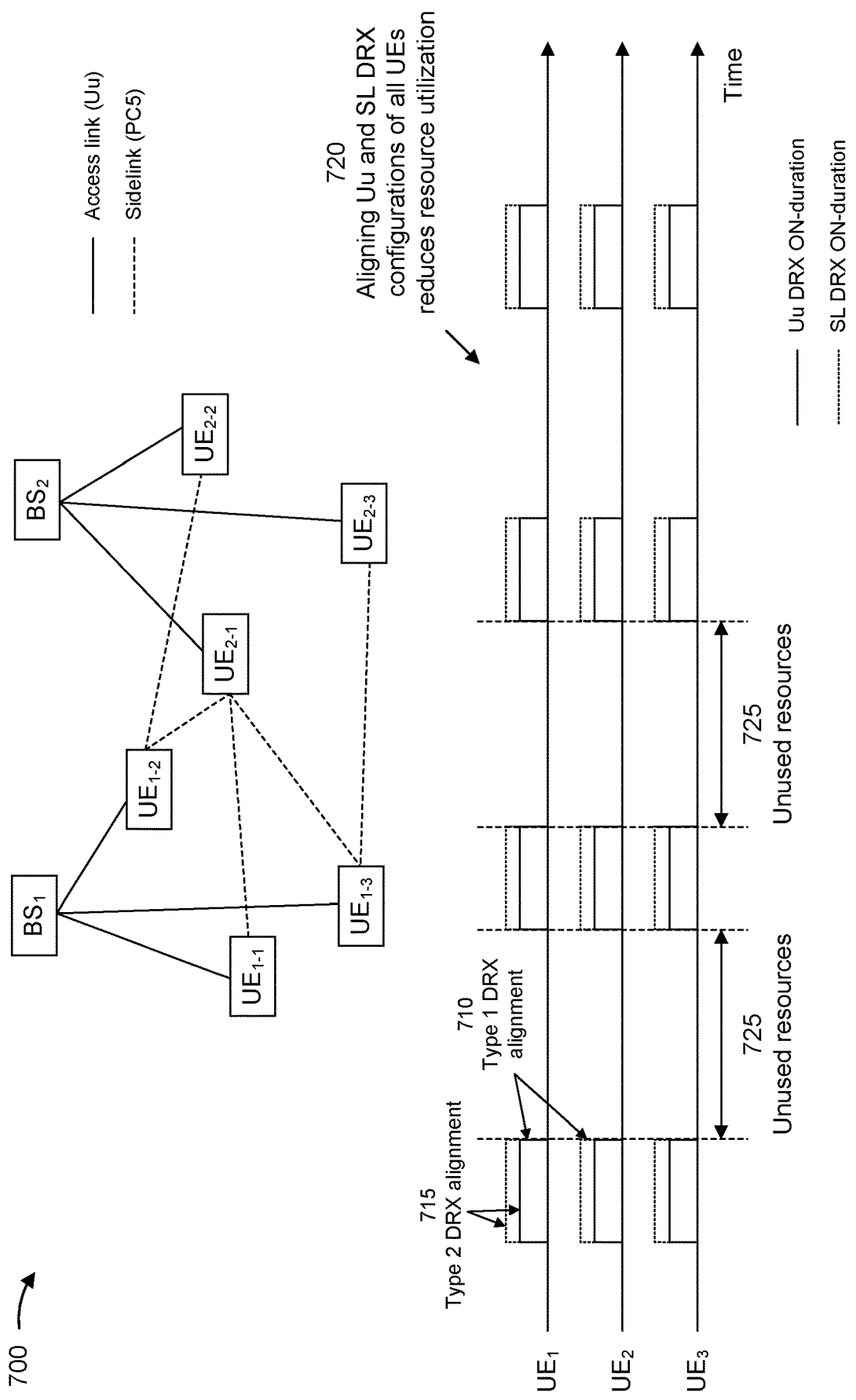
FIGS. 7A-7B are diagrams illustrating examples of DRX alignment, in accordance with the present disclosure.
Figure 7B:
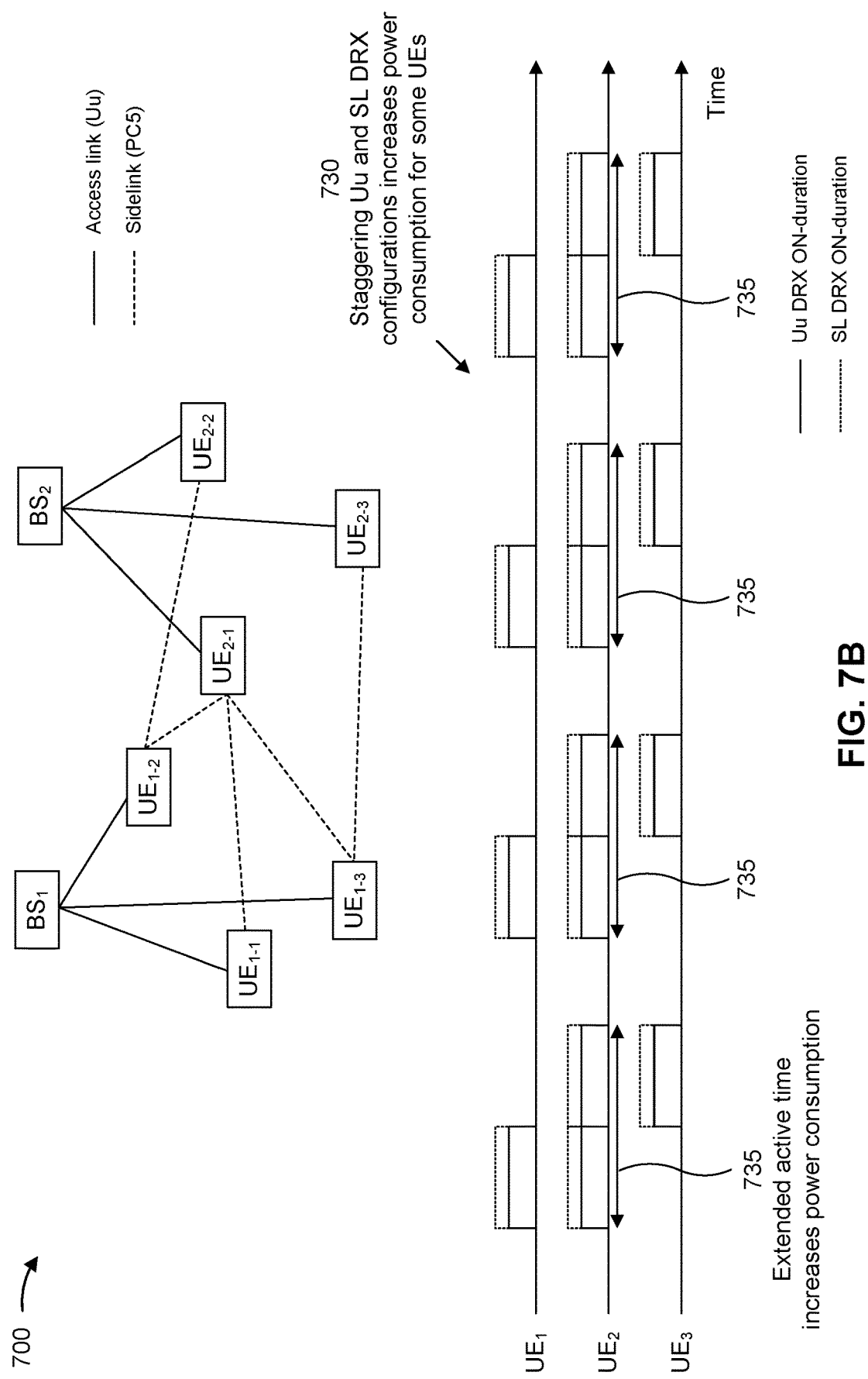

FIGS. 7A-7B are diagrams illustrating examples 700 of DRX alignment, in accordance with the present disclosure. In particular, as described herein, a serving base station for a UE may schedule access link communication on an access link between the base station and the UE, and may schedule sidelink communication on a sidelink between the UE and another UE (e.g., in Mode 1 sidelink operation). Additionally, or alternatively, in some cases, two or more UEs may communicate on the sidelink independently of any serving base station (e.g., in Mode 2 sidelink operation). Accordingly, because one or more UEs that are communicating on a sidelink may also be communicating with a serving base station on an access link, one or more UEs may be configured with access link (or Uu) and sidelink (or PC5) DRX configurations that are misaligned. For example, in some cases, sidelink DRX operation and access link DRX operation may be uncoordinated, such that the UE asynchronously and/or independently performs sidelink DRX operation and access link DRX operation, which may result in a misalignment between sidelink DRX ON-durations and access link DRX ON-durations, a misalignment between sidelink DRX sleep modes and access link DRX sleep modes (also referred to as inactive times), and/or a misalignment between sidelink DRX cycles and access link DRX cycles.

Accordingly, because the misalignment may reduce the potential power savings provided by sidelink DRX operation and access link DRX operation and/or cause communication delays if the sidelink operations require control signaling over the access link, access link DRX configurations and sidelink DRX configurations may be aligned for one or more UEs. However, aligning access link DRX configurations and sidelink DRX configurations poses challenges for various reasons, including that sidelink transmissions between each UE pair are generally bi-directional, in that each UE communicating on a sidelink may act as a transmitting UE to transmit a sidelink communication to a receiving UE, or act as a receiving UE to receive a sidelink communication from a transmitting UE. For example, FIGS. 7A-7B illustrate an example scenario where various UEs are configured to communicate with a serving base station on an access link and with one or more UEs on a sidelink. As shown in FIGS. 7A-7B, a first base station (shown as $BS_1$) may communicate with various served UEs (shown as $UE_{1-1}$ through $UE_{1-3}$) on an access link, and a second base station (shown as $BS_2$) may communicate with various served UEs (shown as $UE_{2-1}$ through $UE_{2-3}$) on an access link. Furthermore, each $UE_{i-j}$ may act as a transmitter or receiver to communicate with one or multiple other UEs on a sidelink, where the general notation $UE_{i-j}$ may refer to the jth UE connected to the ith base station in a wireless network.

As described herein, to increase power savings and/or mitigate other challenges that may arise due to a misalignment between DRX configurations, access link and sidelink DRX configurations may be aligned based on bi-directional transmission between sidelink UEs. For example, as described herein, an access link DRX configuration and a sidelink DRX configuration may be aligned in cases where the access link DRX configuration and the sidelink DRX configuration include respective ON-durations that fully overlap in time (e.g., the access link and sidelink DRX ON-durations start and end at the same time) and/or in cases where the access link DRX configuration and the sidelink DRX configuration include respective ON-durations that partially overlap in time (e.g., there is at least some time period shared between the respective ON-durations of the access link and sidelink DRX configurations).

For example, in FIG. 7A, reference number 710 depicts a Type 1 DRX alignment, where an access link DRX configuration of a transmitting UE is aligned with a sidelink DRX configuration of a receiving UE. In general, the Type 1 alignment may be used when the transmitting UE is operating in sidelink transmission Mode 1. For example, in sidelink transmission Mode 1, the transmitting UE may receive a sidelink grant and data from a serving base station on an access link during the ON-duration of the access link DRX configuration, and the transmitting UE may then forward the data to the receiving UE on a sidelink channel. Accordingly, the receiving UE may need to monitor the sidelink channel when the transmitting UE starts to transmit, which may be achieved by enabling the Type 1 alignment between the access link DRX configuration of the transmitting UE to be aligned with the sidelink DRX configuration of the receiving UE. The Type 1 alignment may be unnecessary in cases where the transmitting UE is operating in sidelink transmission Mode 2, because the transmitting UE communicates on the sidelink without receiving any sidelink grant or data on the access link.

Furthermore, in FIG. 7A, reference number 715 depicts a Type 2 DRX alignment, where a single UE has an access link DRX configuration and a sidelink DRX configuration with respective ON-durations that fully or partially overlap in time. In this case, the Type 2 alignment can ensure that the respective inactive times of the access link and sidelink DRX configurations are aligned, permitting the UE to enter a sleep state to conserve power outside the aligned ON-durations.

Accordingly, in order to align access link and sidelink DRX configurations for a given UE pair that includes a first UE and a second UE communicating on a sidelink, the DRX configurations may be aligned bi-directionally. For example, the DRX configurations of the first UE and the second UE may be aligned in a first transmission direction, where the first UE transmits to the second UE, when the sidelink DRX configuration of the second UE is aligned with the access link DRX configuration of the first UE (Type 1 alignment) and the sidelink DRX configuration of the second UE is also aligned with the sidelink DRX configuration of the second UE (Type 2 alignment). Furthermore, the DRX configurations of the first UE and the second UE may be aligned in a second transmission direction, where the second UE transmits to the first UE, when the sidelink DRX configuration of the first UE is aligned with the access link DRX configuration of the second UE (Type 1 alignment) and the sidelink DRX configuration of the first UE is also aligned with the sidelink DRX configuration of the first UE (Type 2 alignment). Accordingly, the DRX configurations of the first UE and the second UE are aligned if both DRX alignment types are satisfied in both transmission directions.

As shown in FIG. 7A, one approach that may be used in a wireless network to align DRX configurations among multiple UEs may be to align the access link and sidelink DRX configurations of all UEs that are communicating on the sidelink. For example, in FIG. 7A, reference number 720 depicts an example where the access link and sidelink DRX configurations of all UEs are aligned, whereby there is a full or partial overlap in time among the respective ON-durations and inactive times of the access link and sidelink DRX configurations of all UEs. In this way, each UE may communicate on the access link and/or the sidelink during the aligned ON-durations, and each UE may enter a sleep state during the aligned inactive times. In this way, aligning the access link and sidelink DRX configurations of all UEs may reduce latency (e.g., because a transmitting UE does not need to delay transmission on the sidelink while awaiting the ON-duration of the sidelink DRX configuration of the receiving UE) and may reduce power consumption for all UEs (e.g., by maximizing the total time that the UEs spend in a sleep state). However, as further shown in FIG. 7A, and by reference number 725, aligning the access link and sidelink DRX configurations of all UEs may reduce resource utilization because most resources in a time domain are wasted (e.g., unused by any UE).

Accordingly, as shown in FIG. 7B, reference number 730 depicts another approach to aligning DRX configurations among multiple UEs, where a Type 2 alignment may be enabled per UE, and DRX configurations of different UEs may be staggered or otherwise offset in time, which may improve resource utilization. However, in the case where the access link and sidelink DRX configurations are not aligned among all UEs, some UEs may spend less time in a sleep state, which increases power consumption. For example, as shown in FIG. 7B, a second UE (shown as $UE_2$) may have sidelink connections with a first UE (shown as $UE_1$) and a third UE (shown as $UE_3$). Accordingly, in an example where the DRX configurations of the first UE and the third UE are not aligned, the second UE would need to extend the ON-duration(s) of the DRX configurations of the second UE to align with the ON-durations of the DRX configurations of the first UE and the third UE. Consequently, as shown by reference number 735, the second UE must spend more time in an active state (and less time in the sleep state), which increases power consumption for the second UE.

Some aspects described herein relate to techniques and apparatuses to optimize an alignment between access link and sidelink DRX configurations among UEs in a wireless network with respect to a prioritization among UEs, which may improve resource utilization (e.g., increasing usage of sidelink resources in a time domain) and improve performance (e.g., reduce latency and power consumption). For example, as described in further detail herein with respect to FIGS. 8-9, each UE that communicates on a sidelink may be assigned a sidelink DRX priority, where DRX configurations may first be aligned for UEs with a highest sidelink DRX priority before aligning DRX configurations for UEs with lower sidelink DRX priorities. Furthermore, the DRX alignment for UEs with lower sidelink DRX priorities may be dynamically adjusted to accommodate the DRX alignment for UEs with higher sidelink DRX priorities (e.g., by adding one or more ON-durations and/or changing one or more durations to coincide with the ON-duration(s) of a UE with a higher sidelink DRX priority). Furthermore, as described in further detail herein with respect to FIGS. 10-11, some aspects described herein relate to techniques and apparatuses to signal information related to the sidelink DRX priorities assigned to various UEs.

As indicated above, FIGS. 7A-7B are provided as examples. Other examples may differ from what is described with regard to FIGS. 7A-7B.

Figure 8:
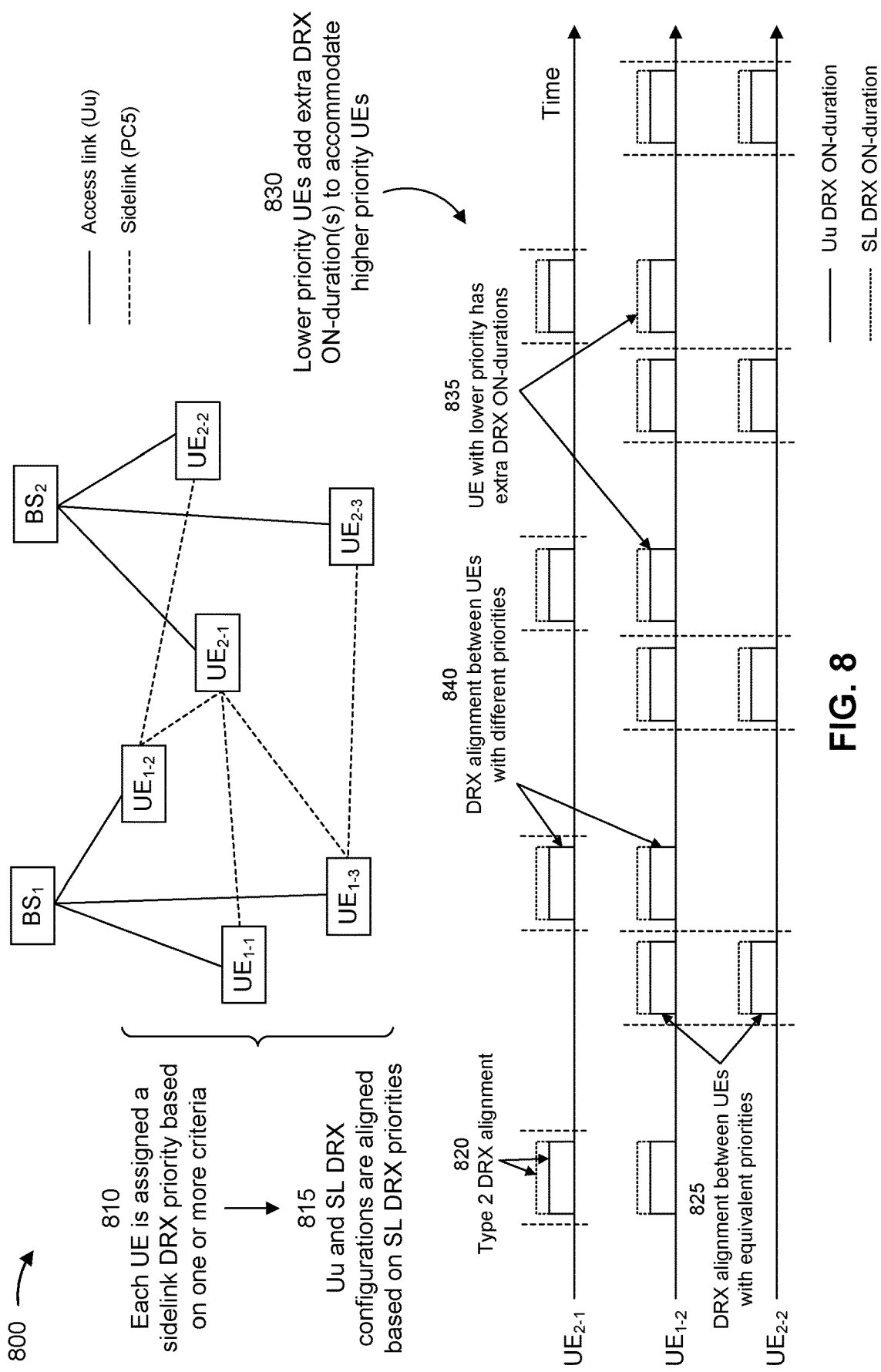
FIGS. 8-9 are diagrams illustrating examples associated with DRX alignment with respect to prioritization, in accordance with the present disclosure.

FIG. 8 is a diagram illustrating an example 800 associated with DRX alignment with respect to prioritization, in accordance with the present disclosure. As shown in FIG. 8, example 800 includes various UEs that communicate with respective serving base stations on an access link and with one or more UEs on a sidelink. For example, as shown in FIG. 8, a first base station (shown as $BS_1$) may communicate with various served UEs (shown as $UE_{1-1}$ through $UE_{1-3}$) on an access link, and a second base station (shown as $BS_2$) may communicate with various served UEs (shown as $UE_{2-1}$ through $UE_{2-3}$) on an access link. Furthermore, each $UE_{i-j}$ may act as a transmitter or receiver to communicate with one or multiple other UEs on a sidelink, where the general notation $UE_{i-j}$ may refer to the jth UE connected to the ith base station in a wireless network.

In some aspects, as shown by reference number 810, each UE engaged in sidelink communication may be assigned a sidelink DRX priority based on one or more criteria. For example, as described in further detail below with reference to FIG. 10, the sidelink DRX priority for a particular UE may be assigned by a serving base station for the UE (e.g., when the UE is in-coverage), autonomously by the UE (e.g., when the UE and all UEs connected to the UE on the sidelink are out-of-coverage), and/or by a serving base station of a peer UE (e.g., when the UE is out-of-coverage and the peer UE is in-coverage). In some aspects, the criteria that may be used to determine the sidelink DRX priority assigned to a UE may include a power consumption requirement of the UE, a QoS requirement that may be static or semi-static, a latency requirement that may be dynamic based on a current deadline requirement for one or more packets pending transmission, and/or a number of sidelink connections associated with the UE, among other examples. Further details related to the criteria that may be used to determine the sidelink DRX priority assigned to a UE are described below with reference to FIG. 10.

In some aspects, as further shown by reference number 815, access link and sidelink DRX configurations may be aligned among multiple UEs in a wireless network based on the respective sidelink DRX priorities assigned to the multiple UEs. For example, in some aspects, the sidelink DRX priority assigned to a UE may be an integer number, P, where DRX alignments may first be enabled for UEs with a highest sidelink DRX priority before DRX alignments are enabled for UEs with lower sidelink DRX priorities. For example, UE may be assigned sidelink DRX priority $P_i^j$, where $P_{i_1}^j = P_{i_2}^j$ and $P_i^{j_1} > P_i^{j_2}$, where $j_1 < j_2$. In the example access link and sidelink communication scenario shown in FIG. 8, $UE_{1-1}$ and $UE_{2-1}$ have a highest sidelink DRX priority, $UE_{1-2}$ and $UE_{2-2}$ have a second-highest sidelink DRX priority, and $UE_{1-3}$ and $UE_{2-3}$ have a lowest sidelink DRX priority. In this case, as shown by reference number 820, a Type 2 DRX alignment may be enabled per UE, where each UE has access link and sidelink DRX configurations with respective ON-durations that fully or partially overlap in time. Furthermore, as shown by reference number 825, a Type 1 DRX alignment may be enabled between UEs that have equivalent sidelink DRX priorities. For example, a Type 1 DRX alignment may be enabled between $UE_{1-1}$ and $UE_{2-1}$ with the highest sidelink DRX priority, between $UE_{1-2}$ and $UE_{2-2}$ with the second-highest sidelink DRX priority, and between $UE_{1-3}$ and $UE_{2-3}$ with the lowest sidelink DRX priority.

Furthermore, as shown by reference number 830, the Type 1 DRX alignments of UEs with lower sidelink DRX priorities may be adjusted to accommodate the DRX alignment(s) of UEs with higher sidelink DRX priorities. For example, where a first UE is communicating with a second UE on a sidelink and the first UE has a higher sidelink DRX priority than the second UE, the access link and sidelink DRX configurations of the second UE may be adjusted to be aligned with the access link and sidelink DRX configurations of the first UE. Otherwise, DRX alignment between the first UE and the second UE may fail in cases where the DRX configurations of the second (low-priority) UE cannot be adjusted to accommodate the DRX alignment of the first (high-priority) UE. For example, as shown by reference number 830, the access link and sidelink DRX configurations of one or more UEs may be adjusted to include extra DRX ON-durations to accommodate the ON-durations of the DRX configurations of one or more peer UEs with a higher sidelink DRX priority. For example, as described herein, the Type 1 DRX alignments of UEs with equivalent sidelink DRX priorities may be staggered or otherwise offset in time in order to improve resource utilization, and extra ON-durations may be added to the DRX configurations of UEs that are communicating on a sidelink with other UEs having higher sidelink DRX priorities. For example, FIG. 8 depicts a scenario where $UE_{1-2}$ is communicating on a sidelink with $UE_{2-2}$, which has the same sidelink DRX priority as $UE_{1-2}$, and with $UE_{2-1}$, which has a higher sidelink DRX priority than $UE_{1-2}$. Accordingly, as shown by reference number 835, $UE_{1-2}$ adds an extra ON-duration to the DRX configuration of the $UE_{1-2}$ to accommodate the DRX alignment of $UE_{2-1}$, which results in $UE_{1-2}$ having a Type 1 DRX alignment with $UE_{2-1}$ and a Type 1 DRX alignment with $UE_{2-2}$, as shown by reference number 840.

As indicated above, FIG. 8 is provided as an example. Other examples may differ from what is described with regard to FIG. 8.

Figure 9:
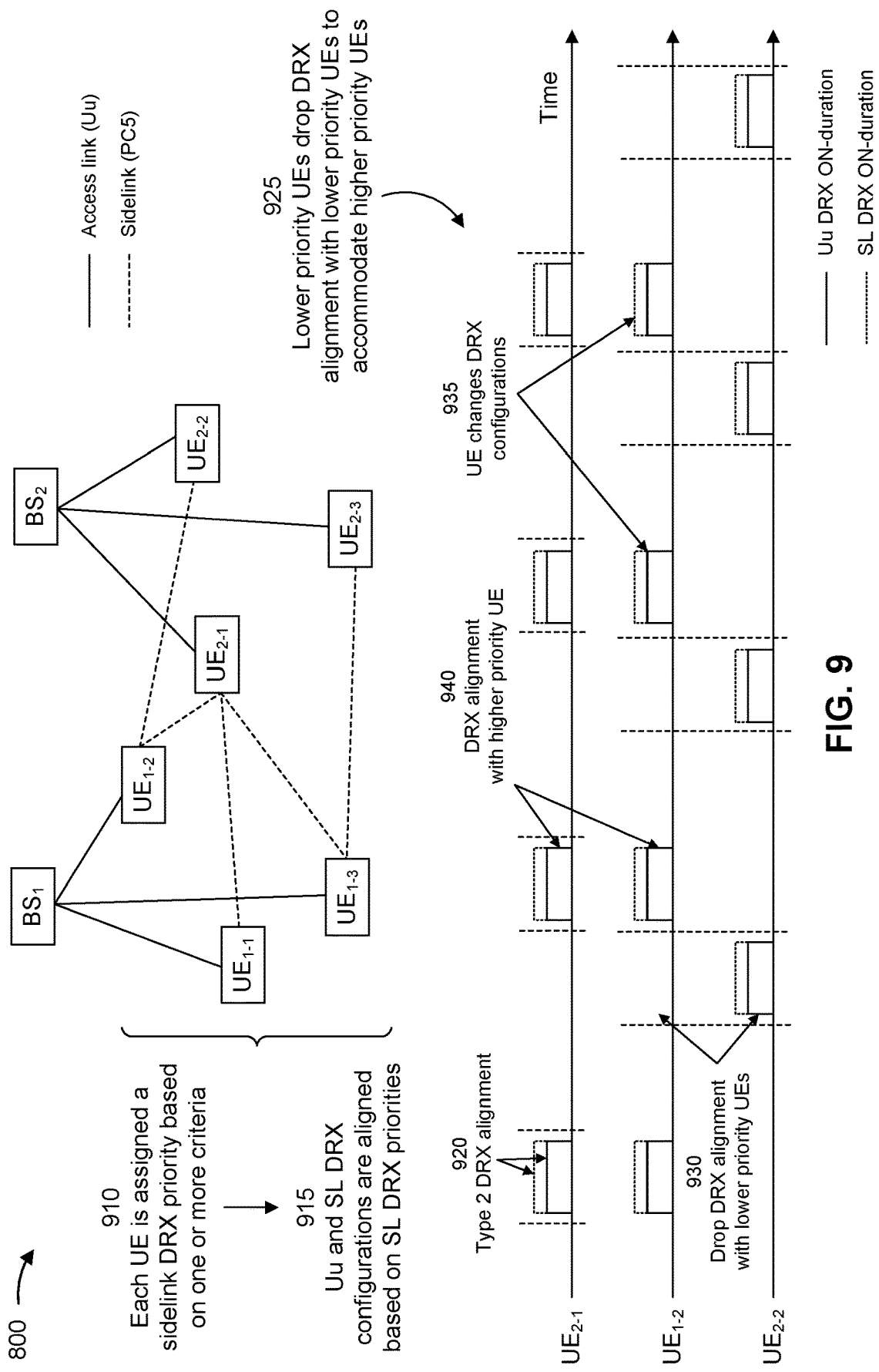

FIG. 9 is a diagram illustrating an example 900 associated with DRX alignment with respect to prioritization, in accordance with the present disclosure. As shown in FIG. 9, example 900 includes various UEs that communicate with respective serving base stations on an access link and with one or more UEs on a sidelink. For example, as shown in FIG. 9, a first base station (shown as $BS_1$) may communicate with various served UEs (shown as $UE_{1-1}$ through $UE_{1-3}$) on an access link, and a second base station (shown as $BS_2$) may communicate with various served UEs (shown as $UE_{2-1}$ through $UE_{2-3}$) on an access link. Furthermore, each $UE_{i-j}$ may act as a transmitter or receiver to communicate with one or multiple other UEs on a sidelink, where the general notation $UE_{i-j}$ may refer to the jth UE connected to the ith base station in a wireless network.

In some aspects, as shown by reference number 910, each UE engaged in sidelink communication may be assigned a sidelink DRX priority based on one or more criteria. For example, as described in further detail below with reference to FIG. 10, the sidelink DRX priority for a particular UE may be assigned by a serving base station for the UE (e.g., when the UE is in-coverage), autonomously by the UE (e.g., when the UE and all UEs connected to the UE on the sidelink are out-of-coverage), and/or by a serving base station of a peer UE (e.g., when the UE is out-of-coverage and the peer UE is in-coverage). In some aspects, the criteria that may be used to determine the sidelink DRX priority assigned to a UE may include a power consumption requirement of the UE, a QoS requirement that may be static or semi-static, a latency requirement that may be dynamic based on a current deadline requirement for one or more packets pending transmission, and/or a number of sidelink connections associated with the UE, among other examples. Further details related to the criteria that may be used to determine the sidelink DRX priority assigned to a UE are described below with reference to FIG. 10.

In some aspects, as further shown by reference number 915, access link and sidelink DRX configurations may be aligned among multiple UEs in a wireless network based on the respective sidelink DRX priorities assigned to the multiple UEs. For example, in some aspects, the sidelink DRX priority assigned to a UE may be an integer number, P, where DRX alignments may first be enabled for UEs with a highest sidelink DRX priority before DRX alignments are enabled for UEs with lower sidelink DRX priorities. For example, UE may be assigned sidelink DRX priority $P_i^j$, where $P_{i_1}^j = P_{i_2}^j$ and $P_i^{j_1} > P_i^{j_2}$, where $j_1 < j_2$. In the example access link and sidelink communication scenario shown in FIG. 9, $UE_{1-1}$ and $UE_{2-1}$ have a highest sidelink DRX priority, $UE_{1-2}$ and $UE_{2-2}$ have a second-highest sidelink DRX priority, and $UE_{1-3}$ and $UE_{2-3}$ have a lowest sidelink DRX priority. In this case, as shown by reference number 920, a Type 2 DRX alignment may be enabled per UE, where each UE has access link and sidelink DRX configurations with respective ON-durations that fully or partially overlap in time. Furthermore, a Type 1 DRX alignment may be enabled between UEs that have equivalent sidelink DRX priorities. For example, a Type 1 DRX alignment may be enabled between $UE_{1-1}$ and $UE_{2-1}$ with the highest sidelink DRX priority, between $UE_{1-2}$ and $UE_{2-2}$ with the second-highest sidelink DRX priority, and between $UE_{1-3}$ and $UE_{2-3}$ with the lowest sidelink DRX priority.

Furthermore, as shown by reference number 925, the Type 1 DRX alignments of UEs with lower sidelink DRX priorities may be adjusted to accommodate the DRX alignment(s) of UEs with higher sidelink DRX priorities. For example, where a first UE is communicating with a second UE on a sidelink and the first UE has a higher sidelink DRX priority than the second UE, the access link and sidelink DRX configurations of the second UE may be adjusted to be aligned with the access link and sidelink DRX configurations of the first UE. Otherwise, DRX alignment between the first UE and the second UE may fail in cases where the DRX configurations of the second (low-priority) UE cannot be adjusted to accommodate the DRX alignment of the first (high-priority) UE. For example, as shown by reference number 925, one or more UEs that are communicating with other UEs having a higher sidelink DRX priority may drop a DRX alignment with other UEs having an equivalent or lower sidelink DRX priority (e.g., drop a DRX ON-duration aligned with the DRX ON-duration of the other UEs with the equivalent or lower sidelink DRX priorities). As further shown, the dropped DRX alignment may be replaced with DRX ON-durations that are aligned with the DRX ON-durations of the UEs with the higher sidelink DRX priorities to accommodate the DRX ON-durations of one or more peer UEs with higher sidelink DRX priorities. For example, as described herein, the Type 1 DRX alignments of UEs with equivalent sidelink DRX priorities may initially be staggered or otherwise offset in time to improve resource utilization. However, when a UE is communicating with two or more UEs with different sidelink DRX priorities, the UE may drop any DRX alignment with the lower-priority UE(s) and add DRX ON-durations that are aligned with the DRX ON-duration(s) of the higher-priority UE(s). For example, FIG. 9 depicts a scenario where $UE_{1-2}$ is communicating on a sidelink with $UE_{2-2}$, which has the same sidelink DRX priority as $UE_{1-2}$, and with $UE_{2-1}$, which has a higher sidelink DRX priority than $UE_{1-2}$. Accordingly, as shown by reference number 930, $UE_{1-2}$ drops the DRX alignment with $UE_{2-2}$ based on $UE_{2-2}$ having a lower sidelink DRX priority than $UE_{2-1}$. Furthermore, as shown by reference number 935, the access link and sidelink DRX configurations of $UE_{1-2}$ are changed to include ON-durations that are aligned with the ON-durations of the DRX configurations associated with $UE_{2-1}$, which results in $UE_{1-2}$ having a Type 1 DRX alignment with $UE_{2-1}$ only, as shown by reference number 940.

As indicated above, FIG. 9 is provided as an example. Other examples may differ from what is described with regard to FIG. 9.

Figure 10:
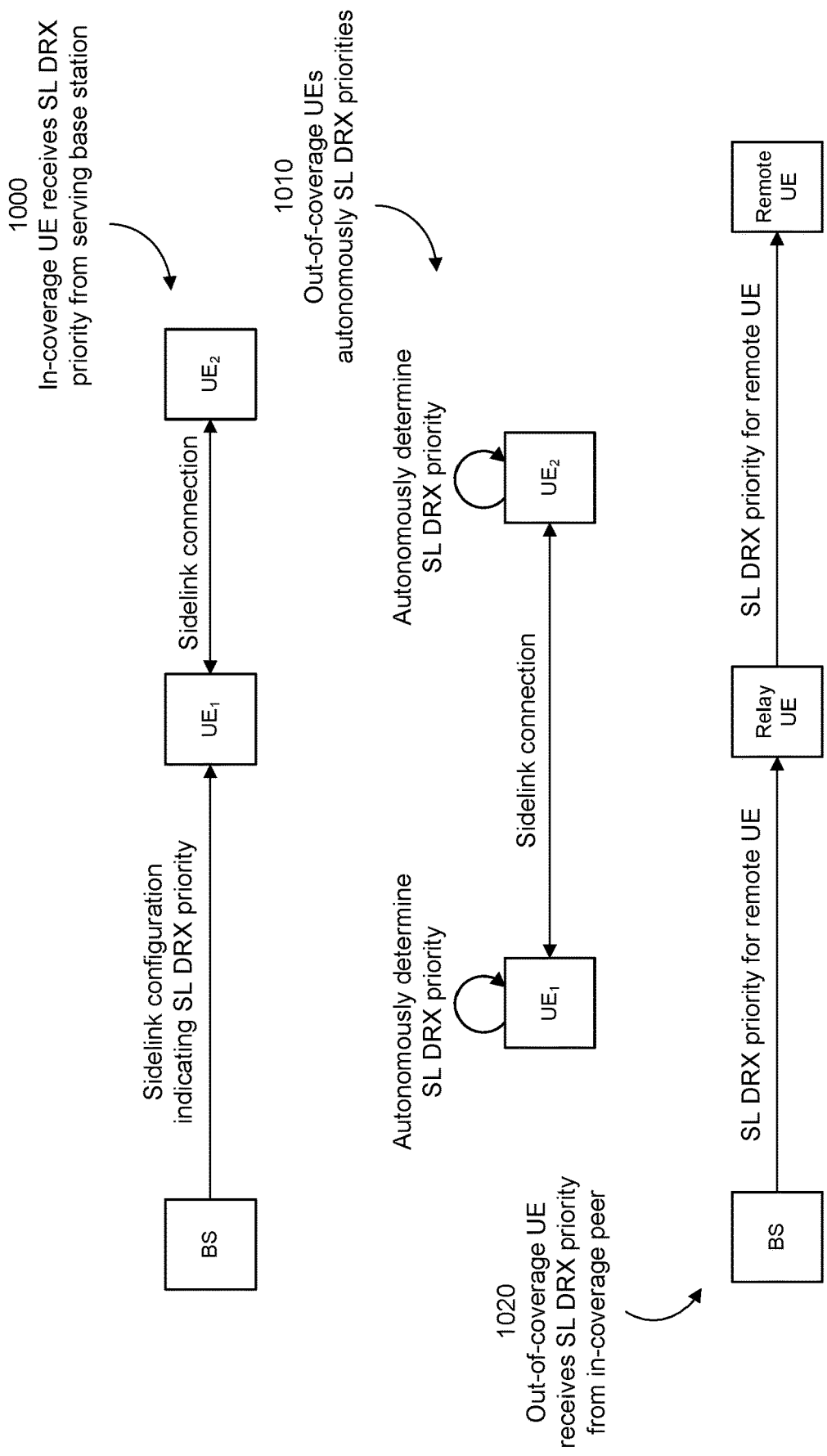
FIGS. 10-11 are diagrams illustrating examples associated with signaling related to DRX alignment with respect to prioritization, in accordance with the present disclosure.

FIG. 10 is a diagram illustrating examples 1000, 1010, 1020 associated with signaling related to DRX alignment with respect to prioritization, in accordance with the present disclosure. As shown in FIG. 10, examples 1000, 1010, 1020 each include a UE that may be configured to communicate with one or more other UEs on a sidelink. Furthermore, as described herein, a network node that determines and/or signals a sidelink DRX priority assigned to a particular UE may vary depending on whether the UE is in-coverage on an access link (e.g., has an active access link connection to a serving base station), out-of-coverage on an access link but in sidelink communication with a peer UE that is in-coverage on an access link, or out-of-coverage on an access link and in sidelink communication with peer UEs that are also out-of-coverage.

As shown in FIG. 10, and by example 1000, a first UE (shown as $UE_1$) communicating on a sidelink with a second UE (shown as $UE_2$) may receive a sidelink configuration that indicates a sidelink DRX priority assigned to the first UE from a serving base station when the first UE is in-coverage on an access link (e.g., in an RRC connected state). For example, the serving base station may assign the sidelink DRX priority to the first UE based on one or more criteria, which may include a power consumption requirement of the first UE, a QoS requirement that may be static or semi-static, a latency requirement that may be dynamic based on a current deadline requirement for one or more packets pending transmission by the first UE, and/or a number of sidelink connections associated with the first UE, among other examples. In some aspects, the sidelink DRX priority assigned to the first UE may be signaled in a message that indicates a dedicated sidelink configuration for the first UE. For example, the sidelink DRX priority may be signaled using an SL-ConfigDedicatedNR parameter that indicates one or more sidelink communication parameters, which may include the sidelink DRX priority assigned to the first UE. For example, the sidelink DRX priority may be signaled using an sl-DRXPriority parameter, which may have an integer value, where a higher value for the sl-DRXPriority parameter may correspond to a higher priority. In some aspects, the first UE may align access link and sidelink DRX configurations of the first UE according to the sidelink DRX priority signaled by the serving base station until updated by the serving base station (e.g., based on a change to the criteria that are used to assign the sidelink DRX priority to the first UE).

For example, if the first UE requires a low power consumption, the first UE may be assigned a higher sidelink priority because DRX alignment generally helps to reduce power consumption (e.g., by having access link and sidelink DRX ON-durations and DRX inactive times that fully or partially overlap in time, because lower priority UEs would adjust their DRX configurations to accommodate the DRX alignment of the higher priority UE). On the other hand, if the first UE can tolerate high power consumption, the first UE may be assigned a lower sidelink priority, which increases power savings for lower priority UEs that may require low power consumption.

Additionally, or alternatively, the criteria used to assign the sidelink DRX priority to a UE may be based on a QoS requirement, where a sidelink DRX alignment priority may be related to QoS priority levels associated with all QoS flows enabled for the UE. Additionally, or alternatively, the criteria used to assign the sidelink DRX priority to a UE may be based on a latency requirement, where the serving base station may know a deadline associated with one or more packets pending transmission by the UE and a time that is remaining before the one or more packets will expire. Accordingly, when a UE has one or more pending packets that are approaching a deadline, the sidelink DRX priority assigned to the UE may be adjusted based on the time remaining before the pending packets expire. For example, because a higher sidelink DRX priority generally helps to reduce the latency and increase the probability of the packets being successfully transmitted prior to expiration, the sidelink DRX priority assigned to a UE may be increased when there is relatively less remaining time for pending packets that remain in a traffic queue.

Additionally, or alternatively, the criteria used to assign the sidelink DRX priority to a UE may be based on a number of sidelink connections associated with the UE. For example, if a UE with a large number of sidelink connections is assigned a high priority, all connected UEs would have to adjust DRX alignments to accommodate the access link and sidelink DRX configurations of the higher-priority UE. Accordingly, a UE with a relatively large number of sidelink connections may be assigned a relatively lower sidelink DRX priority and a UE with relatively fewer sidelink connections may be assigned a relatively higher sidelink DRX priority. Alternatively, in some aspects, a UE with a relatively large number of sidelink connections may be assigned a relatively higher sidelink DRX priority to ensure that all sidelink connections with the UE are power-efficient.

In some aspects, as described herein, a UE may generally receive a sidelink DRX priority from a serving base station (e.g., as shown by example 1000) only when the UE is in-coverage on an access link (e.g., has an active access link connection with the serving base station). Otherwise, in cases where a UE is out-of-coverage on the access link, whereby the UE does not have an active access link connection with the serving base station, the UE may be unable to receive the sidelink DRX priority from the serving base station. Accordingly, in such cases, the UE that is out-of-coverage on the access link may determine the sidelink DRX priority associated with the UE autonomously, or based on signaling from a serving base station associated with a peer UE. For example, in FIG. 10, example 1010 depicts a scenario where a first UE and a second UE are communicating on a sidelink, and the first UE and the second UE are both out-of-coverage. In this case, neither UE may be able to receive a sidelink DRX priority from a serving base station, whereby each UE may autonomously assign a sidelink DRX priority to itself based on one or more of the criteria described above (e.g., a power consumption requirement, a QoS requirement, a latency requirement, and/or a number of sidelink connections, among other examples). Alternatively, example 1020 depicts a scenario where a first UE (shown as a remote UE) is out-of-coverage and communicating on a sidelink with a second UE (shown as a relay UE) that is in-coverage. In this case, the serving base station of the relay UE may assign a sidelink DRX priority to the remote UE, and may signal the sidelink DRX priority assigned to the remote UE to the relay UE (e.g., using an sl-DRXPriority parameter), which may then forward the sidelink DRX priority to the remote UE.

As indicated above, FIG. 10 is provided as an example. Other examples may differ from what is described with regard to FIG. 10.

Figure 11:
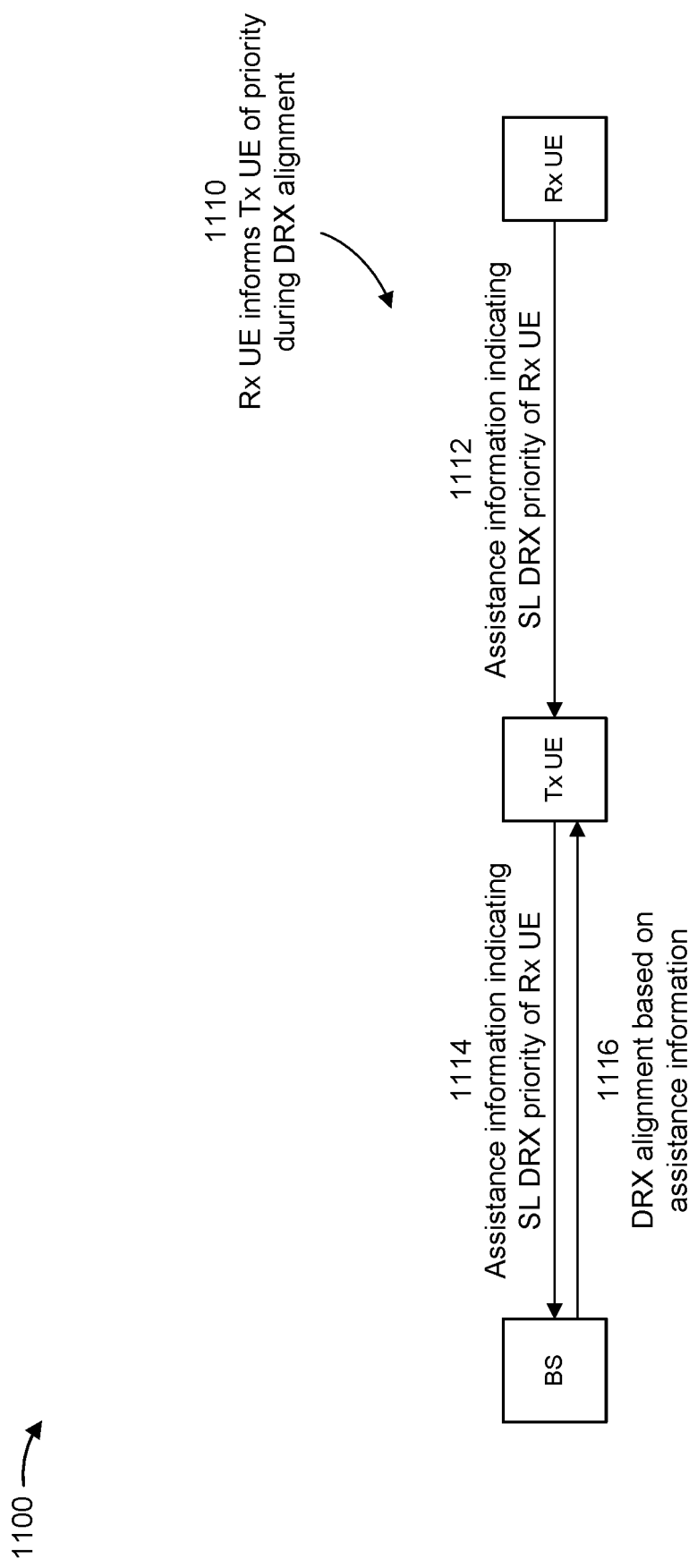

FIG. 11 is a diagram illustrating an example 1100 associated with signaling related to DRX alignment with respect to prioritization, in accordance with the present disclosure. As shown in FIG. 11, example 1100 includes a transmitting UE that may be configured to transmit one or more sidelink communications to a receiving UE and a serving base station of the transmitting UE. In some aspects, the transmitting UE may be transmitting to the receiving UE in sidelink transmission Mode 1, where the serving base station transmits a sidelink grant to the transmitting UE and the transmitting UE uses information in the sidelink grant to transmit to the receiving UE. As shown by reference number 1110 and described herein, the receiving UE may inform the transmitting UE of the sidelink DRX priority assigned to the receiving UE during DRX alignment between the transmitting UE and the receiving UE.

For example, in order to transmit to the receiving UE, the serving base station may need to know the sidelink DRX priority assigned to the receiving UE in order to appropriately determine the transmission parameters to include in the sidelink grant (e.g., how to align the DRX configurations of the transmitting UE). Accordingly, as shown by reference number 1112, the receiving UE may determine a sidelink DRX priority assigned to the receiving UE (e.g., by a serving base station, by the receiving UE, or by a serving base station of a peer UE, as described above in connection with FIG. 10), and the receiving UE may transmit, to the transmitting UE over the sidelink, assistance information that indicates the sidelink DRX priority assigned to the receiving UE. In some aspects, the assistance information may be transmitted from the receiving UE to the transmitting UE via Layer 3 (L3) (e.g., RRC) signaling, and may indicate the sidelink DRX priority according to an integer value (e.g., using the sl-DRXPriority parameter or another suitable parameter). For example, L3 signaling may be used to communicate the assistance information during initial DRX alignment between the transmitting UE and the receiving UE, or to update the sidelink DRX priority assigned to a UE in cases where the sidelink DRX priority is updated infrequently. Additionally, or alternatively, the assistance information may include Layer 1 or Layer 2 (L1/L2) signaling, such as sidelink control information (SCI) or a sidelink medium access control (MAC) control element (MAC-CE) to update a sidelink DRX priority value (e.g., L3 or RRC signaling may configure a set of values for the sidelink DRX priority, and the L1/L2 signaling may be used to point to one of the values in the configured set of values). As further shown in FIG. 11, and by reference number 1114, the transmitting UE may then communicate, to the serving base station of the transmitting UE, the assistance information that indicates the sidelink DRX priority assigned to the receiving UE. Accordingly, as shown by reference number 1116, the serving base station may perform a DRX alignment for the transmitting UE based on the assistance information (e.g., assigning a sidelink DRX priority to the transmitting UE that results in a Type 1 alignment between the transmitting and receiving UE).

As indicated above, FIG. 11 is provided as an example. Other examples may differ from what is described with regard to FIG. 11.

Figure 12:
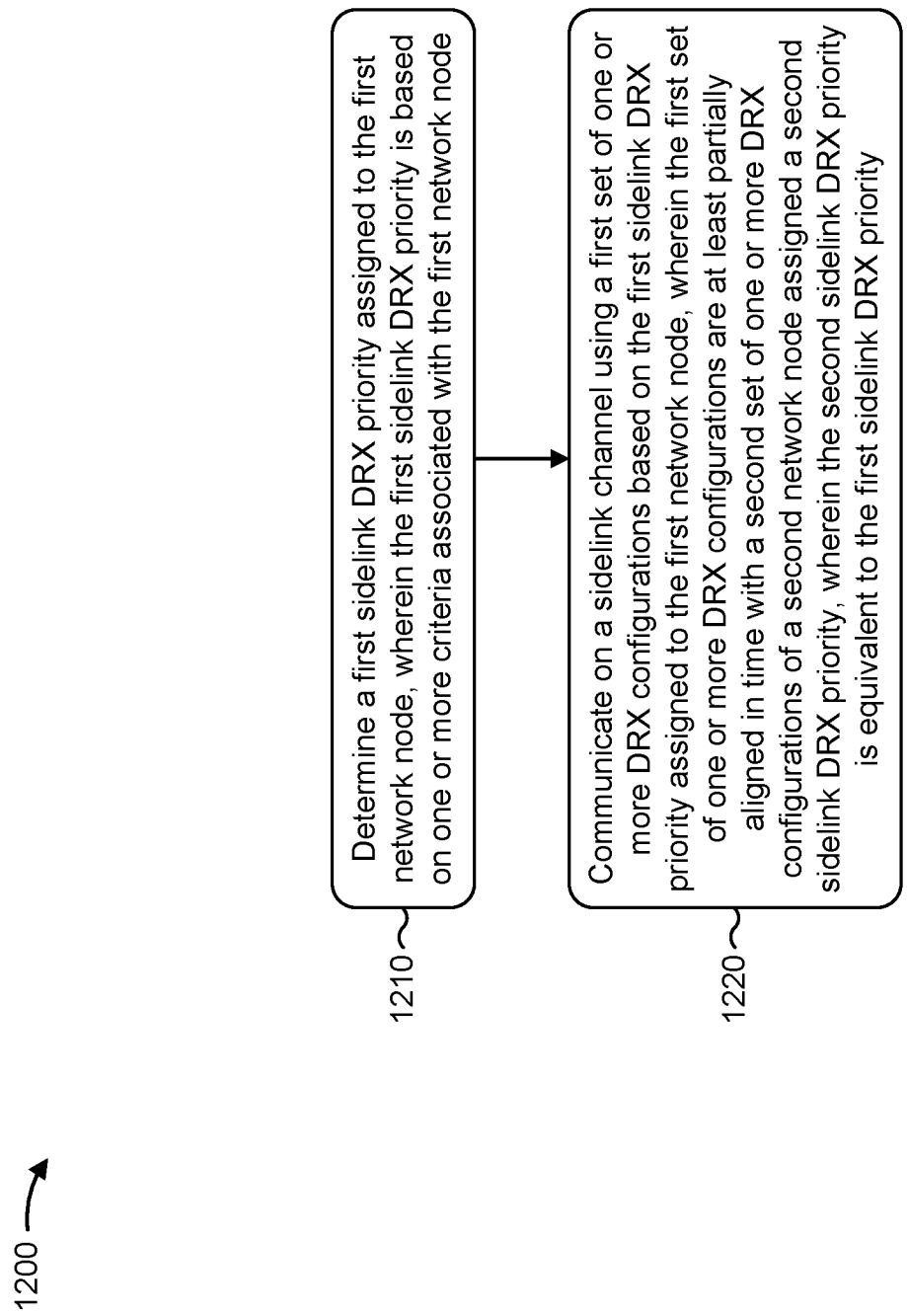
FIGS. 12-13 are diagrams illustrating example processes associated with DRX alignment with respect to prioritization, in accordance with the present disclosure.

FIG. 12 is a diagram illustrating an example process 1200 performed, for example, by a first network node, in accordance with the present disclosure. Example process 1200 is an example where the first network node (e.g., UE 120, UE 305-1, UE 305-2, Tx/Rx UE 405, Rx/Tx UE 410, and/or UE$_{i-j}$, among other examples) performs operations associated with DRX alignment with respect to prioritization.

As shown in FIG. 12, in some aspects, process 1200 may include determining a first sidelink DRX priority assigned to the first network node, wherein the first sidelink DRX priority is based on one or more criteria associated with the first network node (block 1210). For example, the first network node (e.g., using communication manager 140 and/or DRX priority component 1408, depicted in FIG. 14) may determine a first sidelink DRX priority assigned to the first network node, wherein the first sidelink DRX priority is based on one or more criteria associated with the first network node, as described above.

As further shown in FIG. 12, in some aspects, process 1200 may include communicating on a sidelink channel using a first set of one or more DRX configurations based on the first sidelink DRX priority assigned to the first network node, wherein the first set of one or more DRX configurations are at least partially aligned in time with a second set of one or more DRX configurations of a second network node assigned a second sidelink DRX priority, wherein the second sidelink DRX priority is equivalent to the first sidelink DRX priority (block 1220). For example, the first network node (e.g., using communication manager 140, reception component 1402, and/or transmission component 1404, depicted in FIG. 14) may communicate on a sidelink channel using a first set of one or more DRX configurations based on the first sidelink DRX priority assigned to the first network node, wherein the first set of one or more DRX configurations are at least partially aligned in time with a second set of one or more DRX configurations of a second network node assigned a second sidelink DRX priority, wherein the second sidelink DRX priority is equivalent to the first sidelink DRX priority, as described above.

Process 1200 may include additional aspects, such as any single aspect or any combination of aspects described below and/or in connection with one or more other processes described elsewhere herein.

In a first aspect, process 1200 includes adjusting the first set of one or more DRX configurations to be at least partially aligned in time with a DRX configuration of a third network node assigned a third sidelink DRX priority that is higher than the first sidelink DRX priority.

In a second aspect, alone or in combination with the first aspect, adjusting the first set of one or more DRX configurations includes adding, before or after a first ON-duration that is based on the first sidelink DRX priority, a second ON-duration that is aligned with the DRX configuration of the third network node.

In a third aspect, alone or in combination with one or more of the first and second aspects, adjusting the first set of one or more DRX configurations includes replacing an ON-duration that is based on the first sidelink DRX priority with an ON-duration that is aligned with the DRX configuration of the third network node.

In a fourth aspect, alone or in combination with one or more of the first through third aspects, the one or more criteria include a power consumption constraint associated with the first network node.

In a fifth aspect, alone or in combination with one or more of the first through fourth aspects, the one or more criteria include one or more QoS requirements associated with the first network node.

In a sixth aspect, alone or in combination with one or more of the first through fifth aspects, the one or more criteria include a latency requirement or a deadline associated with one or more packets to be transmitted on the sidelink channel by the first network node.

In a seventh aspect, alone or in combination with one or more of the first through sixth aspects, the one or more criteria include a number of sidelink connections associated with the first network node.

In an eighth aspect, alone or in combination with one or more of the first through seventh aspects, process 1200 includes receiving, on an access link, information that indicates the first sidelink DRX priority assigned to the first network node from a serving network node.

In a ninth aspect, alone or in combination with one or more of the first through eighth aspects, process 1200 includes transmitting, to a third network node in communication with the first network node on the sidelink channel, assistance information that indicates the first sidelink DRX priority assigned to the first network node.

In a tenth aspect, alone or in combination with one or more of the first through ninth aspects, process 1200 includes receiving, from a third network node in communication with the first network node on the sidelink channel, assistance information that indicates a sidelink DRX priority assigned to the third network node, and forwarding, to a serving network node, the assistance information.

In an eleventh aspect, alone or in combination with one or more of the first through tenth aspects, determining the first sidelink DRX priority assigned to the first network node is performed by the first network node based on the first network node not having an access link connection to a serving network node.

In a twelfth aspect, alone or in combination with one or more of the first through eleventh aspects, process 1200 includes receiving, on the sidelink channel from a relay network node, information that indicates the first sidelink DRX priority assigned to the first network node based on the first network node not having an access link connection to a serving network node.

In a thirteenth aspect, alone or in combination with one or more of the first through twelfth aspects, process 1200 includes receiving, on an access link from a serving network node, information that indicates a third sidelink DRX priority assigned to a third network node in communication with the first network node on the sidelink channel based on the third network node not having an access link connection, and forwarding, on the sidelink channel to the third network node, the information that indicates the third sidelink DRX priority assigned to the third network node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
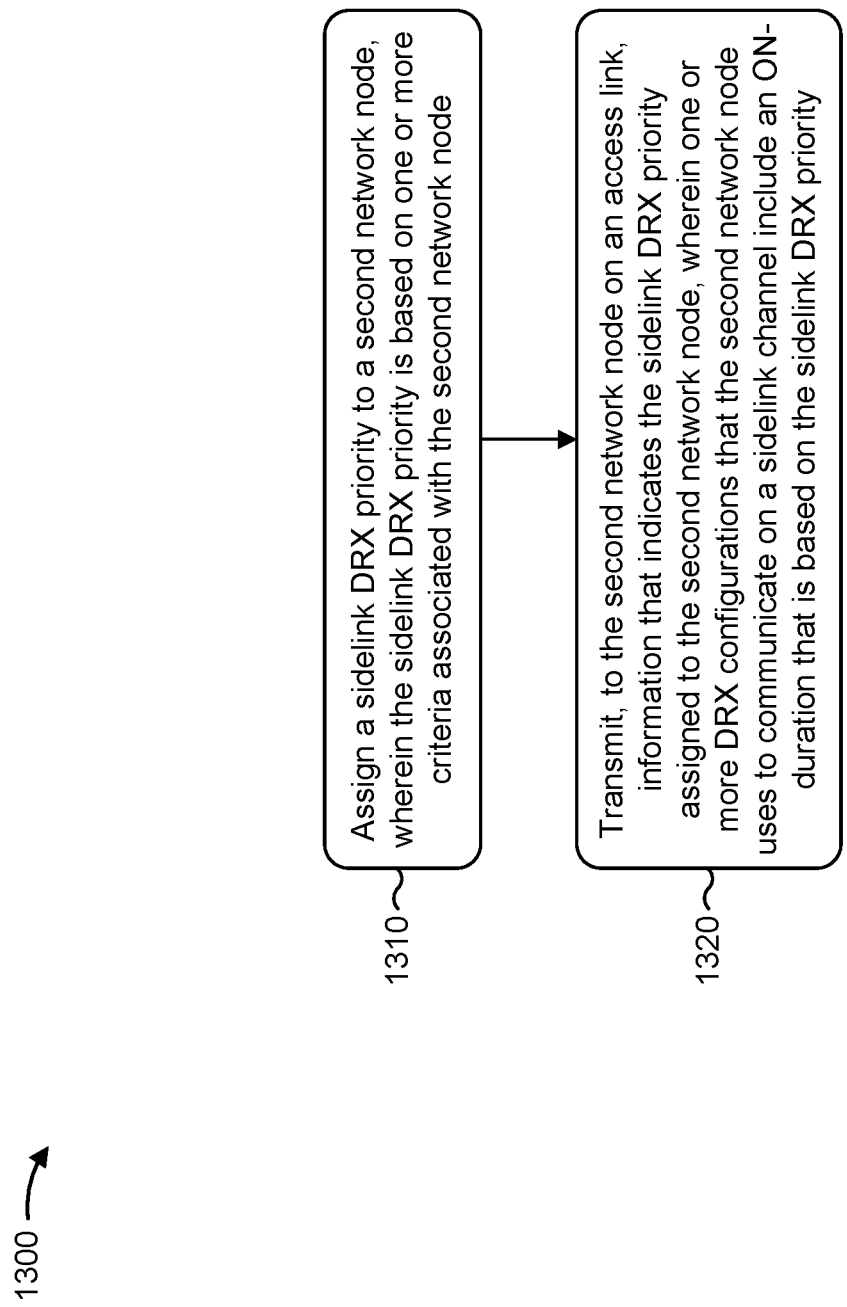

FIG. 13 is a diagram illustrating an example process 1300 performed, for example, by a first network node, in accordance with the present disclosure. Example process 1300 is an example where the first network node (e.g., base station 110) performs operations associated with DRX alignment with respect to prioritization.

As shown in FIG. 13, in some aspects, process 1300 may include assigning a sidelink DRX priority to a second network node, wherein the sidelink DRX priority is based on one or more criteria associated with the second network node (block 1310). For example, the first network node (e.g., using communication manager 150 and/or DRX priority component 1508, depicted in FIG. 15) may assign a sidelink DRX priority to a second network node, wherein the sidelink DRX priority is based on one or more criteria associated with the second network node, as described above.

As further shown in FIG. 13, in some aspects, process 1300 may include transmitting, to the second network node on an access link, information that indicates the sidelink DRX priority assigned to the second network node, wherein one or more DRX configurations that the second network node uses to communicate on a sidelink channel include an ON-duration that is based on the sidelink DRX priority (block 1320). For example, the first network node (e.g., using communication manager 150 and/or transmission component 1504, depicted in FIG. 15) may transmit, to the second network node on an access link, information that indicates the sidelink DRX priority assigned to the second network node, wherein one or more DRX configurations that the second network node uses to communicate on a sidelink channel include an ON-duration that is based on the sidelink DRX priority, as described above.

Process 1300 may include additional aspects, such as any single aspect or any combination of aspects described below and/or in connection with one or more other processes described elsewhere herein.

In a first aspect, the one or more criteria include a power consumption constraint associated with the second network node.

In a second aspect, alone or in combination with the first aspect, the one or more criteria include one or more QoS requirements associated with the second network node.

In a third aspect, alone or in combination with one or more of the first and second aspects, the one or more criteria include a latency requirement or a deadline associated with one or more packets to be transmitted on the sidelink channel by the second network node.

In a fourth aspect, alone or in combination with one or more of the first through third aspects, the one or more criteria include a number of sidelink connections associated with the second network node.

In a fifth aspect, alone or in combination with one or more of the first through fourth aspects, process 1300 includes receiving, from the second network node, assistance information that indicates a sidelink DRX priority assigned to a third network node in communication with the second network node on the sidelink channel, and transmitting, to the second network node, information that indicates one or more sidelink transmission parameters for the second network node based on the sidelink DRX priority assigned to the third network node.

In a sixth aspect, alone or in combination with one or more of the first through fifth aspects, process 1300 includes assigning a sidelink DRX priority to a third network node in communication with the second network node on the sidelink channel based on the third network node not having an access link connection to a serving network node, and transmitting, on the sidelink channel to the second network node, information that indicates the sidelink DRX priority assigned to the third network node.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
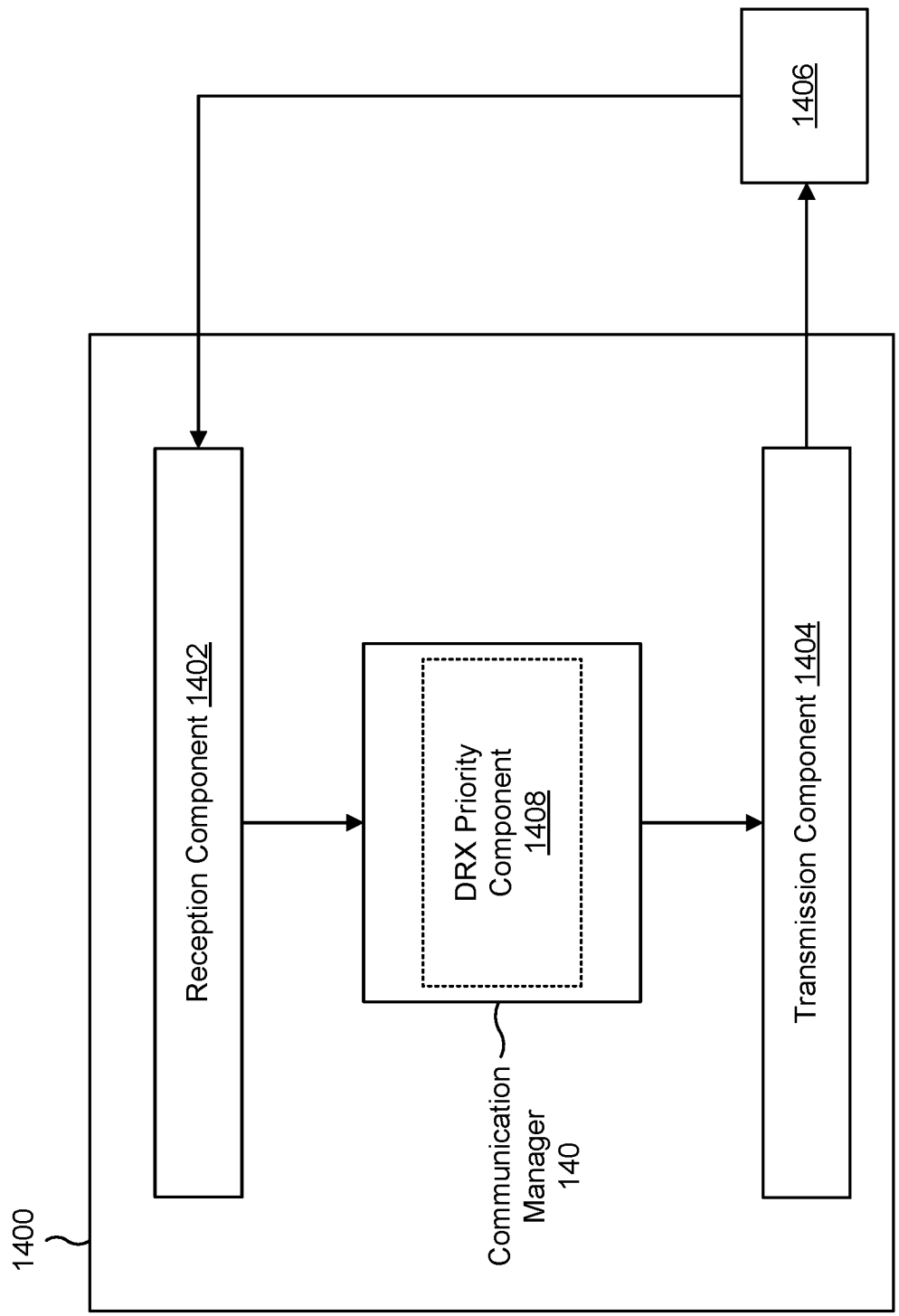
FIGS. 14-15 are diagrams of example apparatuses for wireless communication, in accordance with the present disclosure.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include a DRX priority component 1408, among other examples.

In some aspects, the apparatus 1400 may be configured to perform one or more operations described herein in connection with FIGS. 8-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The DRX priority component 1408 may determine a first sidelink DRX priority assigned to the apparatus 1400, wherein the first sidelink DRX priority is based on one or more criteria associated with the apparatus 1400. The reception component 1402 and/or the transmission component 1404 may be used to communicate on a sidelink channel using a first set of one or more DRX configurations based on the first sidelink DRX priority assigned to the apparatus 1400, wherein the first set of one or more DRX configurations are at least partially aligned in time with a second set of one or more DRX configurations of at least a network node (e.g., the apparatus 1406) assigned a second sidelink DRX priority, wherein the second sidelink DRX priority is equivalent to the first sidelink DRX priority.

The DRX priority component 1408 may adjust the first set of one or more DRX configurations to be at least partially aligned in time with a DRX configuration of a third network node assigned a third sidelink DRX priority that is higher than the first sidelink DRX priority.

The reception component 1402 may receive, on an access link, information that indicates the first sidelink DRX priority assigned to the first network node from a serving network node.

The transmission component 1404 may transmit, to a third network node in communication with the first network node on the sidelink channel, assistance information that indicates the first sidelink DRX priority assigned to the first network node.

The reception component 1402 may receive, from a third network node in communication with the first network node on the sidelink channel, assistance information that indicates a sidelink DRX priority assigned to the third network node. The transmission component 1404 may forward, to a serving network node, the assistance information.

The reception component 1402 may receive, on the sidelink channel from a relay network node, information that indicates the first sidelink DRX priority assigned to the first network node based on the first network node not having an access link connection to a serving network node.

The reception component 1402 may receive, on an access link from a serving network node, information that indicates a third sidelink DRX priority assigned to a third network node in communication with the first network node on the sidelink channel based on the third network node not having an access link connection. The transmission component 1404 may forward, on the sidelink channel to the third network node, the information that indicates the third sidelink DRX priority assigned to the third network node.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
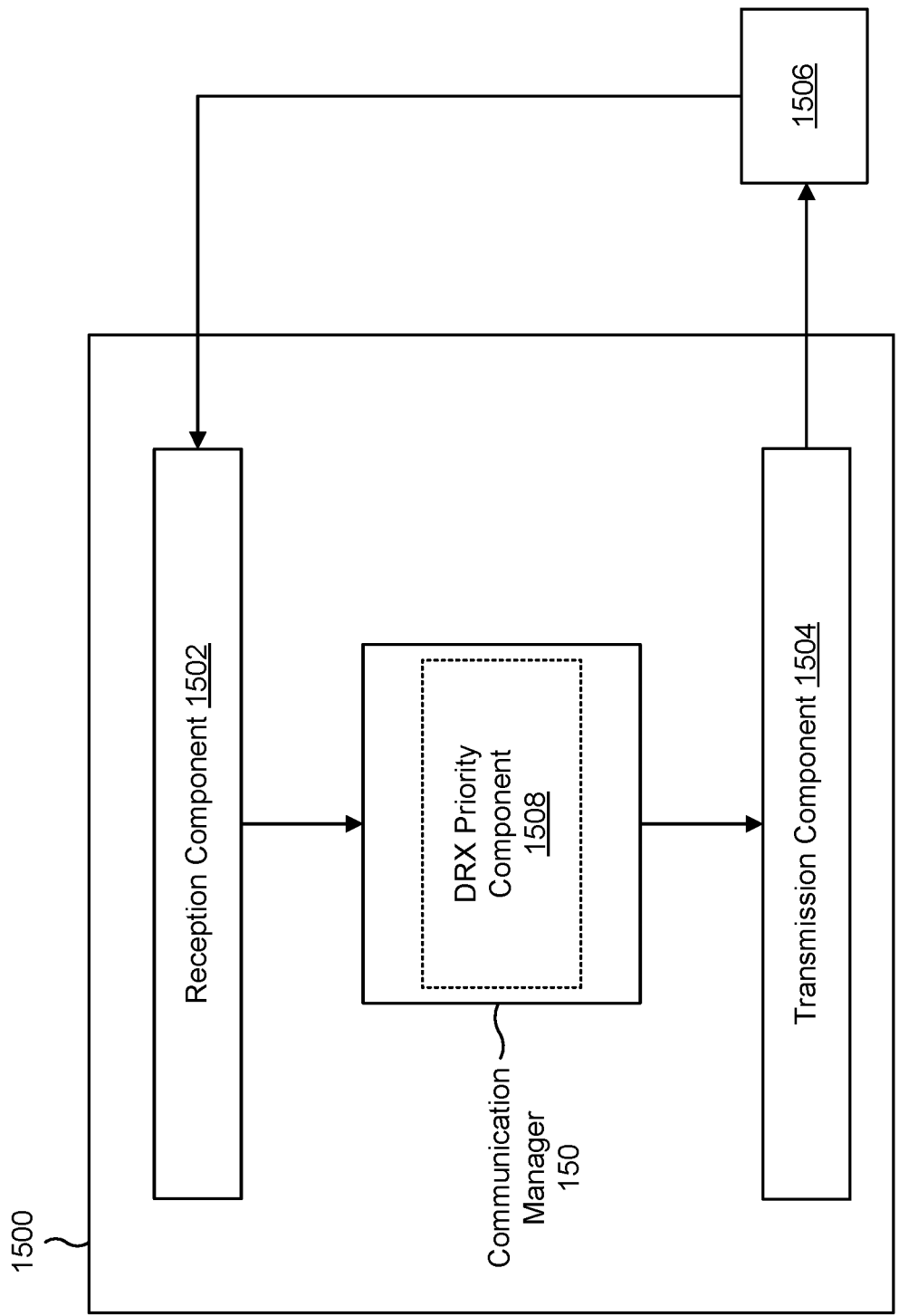

FIG. 15 is a diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150. The communication manager 150 may include a DRX priority component 1508, among other examples.

In some aspects, the apparatus 1500 may be configured to perform one or more operations described herein in connection with FIGS. 8-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the base station described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the base station described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the base station described in connection with FIG. 2. In some aspects, the transmission component 1504 may be co-located with the reception component 1502 in a transceiver.

The DRX priority component 1508 may assign a sidelink DRX priority to a second network node (e.g., the apparatus 1506), wherein the sidelink DRX priority is based on one or more criteria associated with the second network node. The transmission component 1504 may transmit, to the second network node on an access link, information that indicates the sidelink DRX priority assigned to the second network node, wherein one or more DRX configurations that the second network node uses to communicate on a sidelink channel include an ON-duration that is based on the sidelink DRX priority.

The reception component 1502 may receive, from the second network node, assistance information that indicates a sidelink DRX priority assigned to a third network node in communication with the second network node on the sidelink channel. The transmission component 1504 may transmit, to the second network node, information that indicates one or more sidelink transmission parameters for the second network node based on the sidelink DRX priority assigned to the third network node.

The DRX priority component 1508 may assign a sidelink DRX priority to a third network node in communication with the second network node on the sidelink channel based on the third network node not having an access link connection to a serving network node. The transmission component 1504 may transmit, on the sidelink channel to the second network node, information that indicates the sidelink DRX priority assigned to the third network node.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a first network node, comprising: determining a first sidelink DRX priority assigned to the first network node, wherein the first sidelink DRX priority is based on one or more criteria associated with the first network node; and communicating on a sidelink channel using a first set of one or more DRX configurations based on the first sidelink DRX priority assigned to the first network node, wherein the first set of one or more DRX configurations are at least partially aligned in time with a second set of one or more DRX configurations of a second network node assigned a second sidelink DRX priority, wherein the second sidelink DRX priority is equivalent to the first sidelink DRX priority.

Aspect 2: The method of Aspect 1, further comprising: adjusting the first set of one or more DRX configurations to be at least partially aligned in time with a DRX configuration of a third network node assigned a third sidelink DRX priority that is higher than the first sidelink DRX priority.

Aspect 3: The method of Aspect 2, wherein adjusting the first set of one or more DRX configurations includes adding, before or after a first ON-duration that is based on the first sidelink DRX priority, a second ON-duration that is aligned with the DRX configuration of the third network node.

Aspect 4: The method of Aspect 2, wherein adjusting the one or more DRX configurations includes replacing an ON-duration that is based on the first sidelink DRX priority with an ON-duration that is aligned with the DRX configuration of the third network node.

Aspect 5: The method of any of Aspects 1-4, wherein the one or more criteria include a power consumption constraint associated with the first network node.

Aspect 6: The method of any of Aspects 1-5, wherein the one or more criteria include one or more QoS requirements associated with the first network node.

Aspect 7: The method of any of Aspects 1-6, wherein the one or more criteria include a latency requirement or a deadline associated with one or more packets to be transmitted on the sidelink channel by the first network node.

Aspect 8: The method of any of Aspects 1-7, wherein the one or more criteria include a number of sidelink connections associated with the first network node.

Aspect 9: The method of any of Aspects 1-8, further comprising: receiving, on an access link, information that indicates the first sidelink DRX priority assigned to the first network node from a serving network node.

Aspect 10: The method of any of Aspects 1-9, further comprising: transmitting, to a third network node in communication with the first network node on the sidelink channel, assistance information that indicates the first sidelink DRX priority assigned to the first network node.

Aspect 11: The method of any of Aspects 1-10, further comprising: receiving, from a third network node in communication with the first network node on the sidelink channel, assistance information that indicates a sidelink DRX priority assigned to the third network node; and forwarding, to a serving network node, the assistance information.

Aspect 12: The method of any of Aspects 1-8 and 10-11, wherein determining the first sidelink DRX priority assigned to the first network node is performed by the first network node based on the first network node not having an access link connection to a serving network node.

Aspect 13: The method of any of Aspects 1-8 and 10-11, further comprising: receiving, on the sidelink channel from a relay network node, information that indicates the first sidelink DRX priority assigned to the first network node based on the first network node not having an access link connection to a serving network node.

Aspect 14: The method of any of Aspects 1-11, further comprising: receiving, on an access link from a serving network node, information that indicates a third sidelink DRX priority assigned to a third network node in communication with the first network node on the sidelink channel based on the third network node not having an access link connection; and forwarding, on the sidelink channel to the third network node, the information that indicates the third sidelink DRX priority assigned to the third network node.

Aspect 15: A method of wireless communication performed by a first network node, comprising: assigning a sidelink DRX priority to a second network node, wherein the sidelink DRX priority is based on one or more criteria associated with the second network node; and transmitting, to the second network node on an access link, information that indicates the sidelink DRX priority assigned to the second network node, wherein one or more DRX configurations that the second network node uses to communicate on a sidelink channel include an ON-duration that is based on the sidelink DRX priority.

Aspect 16: The method of Aspect 15, wherein the one or more criteria include a power consumption constraint associated with the second network node.

Aspect 17: The method of any of Aspects 15-16, wherein the one or more criteria include one or more QoS requirements associated with the second network node.

Aspect 18: The method of any of Aspects 15-17, wherein the one or more criteria include a latency requirement or a deadline associated with one or more packets to be transmitted on the sidelink channel by the second network node.

Aspect 19: The method of any of Aspects 15-18, wherein the one or more criteria include a number of sidelink connections associated with the second network node.

Aspect 20: The method of any of Aspects 15-19, further comprising: receiving, from the second network node, assistance information that indicates a sidelink DRX priority assigned to a third network node in communication with the second network node on the sidelink channel; and transmitting, to the second network node, information that indicates one or more sidelink transmission parameters for the second network node based on the sidelink DRX priority assigned to the third network node.

Aspect 21: The method of any of Aspects 15-20, further comprising: assigning a sidelink DRX priority to a third network node in communication with the second network node on the sidelink channel based on the third network node not having an access link connection to a serving network node; and transmitting, on the sidelink channel to the second network node, information that indicates the sidelink DRX priority assigned to the third network node.

Aspect 22: An apparatus for wireless communication at a device, comprising a processor; memory coupled with the processor; and instructions stored in the memory and executable by the processor to cause the apparatus to perform the method of one or more of Aspects 1-14.

Aspect 23: A device for wireless communication, comprising a memory and one or more processors coupled to the memory, the one or more processors configured to perform the method of one or more of Aspects 1-14.

Aspect 24: An apparatus for wireless communication, comprising at least one means for performing the method of one or more of Aspects 1-14.

Aspect 25: A non-transitory computer-readable medium storing code for wireless communication, the code comprising instructions executable by a processor to perform the method of one or more of Aspects 1-14.

Aspect 26: A non-transitory computer-readable medium storing a set of instructions for wireless communication, the set of instructions comprising one or more instructions that, when executed by one or more processors of a device, cause the device to perform the method of one or more of Aspects 1-14.

Aspect 27: An apparatus for wireless communication at a device, comprising a processor; memory coupled with the processor; and instructions stored in the memory and executable by the processor to cause the apparatus to perform the method of one or more of Aspects 15-21.

Aspect 28: A device for wireless communication, comprising a memory and one or more processors coupled to the memory, the one or more processors configured to perform the method of one or more of Aspects 15-21.

Aspect 29: An apparatus for wireless communication, comprising at least one means for performing the method of one or more of Aspects 15-21.

Aspect 30: A non-transitory computer-readable medium storing code for wireless communication, the code comprising instructions executable by a processor to perform the method of one or more of Aspects 15-21.

Aspect 31: A non-transitory computer-readable medium storing a set of instructions for wireless communication, the set of instructions comprising one or more instructions that, when executed by one or more processors of a device, cause the device to perform the method of one or more of Aspects 15-21.

The foregoing disclosure provides illustration and description but is neither exhaustive nor limiting of the scope of this disclosure. For example, various aspects and examples are disclosed herein, but this disclosure is not limited to the precise form in which such aspects and examples are described. Modifications and variations may be made in light of the above disclosure or may be acquired from practice of the aspects.

As used herein, the term "component" shall be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. Systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the term "or" is intended to be inclusive when used in a series and may be used interchangeably with "and/or," unless explicitly stated otherwise (e.g., if used in combination with "either" or "only one of").

What is claimed is:

1. A first network node, comprising:
   a memory; and
   one or more processors coupled to the memory, wherein the one or more processors are configured to:
   determine a first sidelink discontinuous reception (DRX) priority assigned to the first network node, wherein the first sidelink DRX priority is based on one or more criteria associated with the first network node; and
   communicate on a sidelink channel using a first set of one or more DRX configurations based on the first sidelink DRX priority assigned to the first network node, wherein the first set of one or more DRX configurations are at least partially aligned in time with a second set of one or more DRX configurations of a second network node assigned a second sidelink DRX priority, wherein the second sidelink DRX priority is equivalent to the first sidelink DRX priority.

2. The first network node of claim 1, wherein the one or more processors are configured to:
adjust the first set of one or more DRX configurations to be at least partially aligned in time with a DRX configuration of a third network node assigned a third sidelink DRX priority that is higher than the first sidelink DRX priority.

3. The first network node of claim 2, wherein the one or more processors, to adjust the first set of one or more DRX configurations, are configured to add, before or after a first ON-duration that is based on the first sidelink DRX priority, a second ON-duration that is aligned with the DRX configuration of the third network node.

4. The first network node of claim 2, wherein the one or more processors, to adjust the first set of one or more DRX configurations, are configured to replace an ON-duration that is based on the first sidelink DRX priority with an ON-duration that is aligned with the DRX configuration of the third network node.

5. The first network node of claim 1, wherein the one or more criteria include at least one of:
a power consumption constraint associated with the first network node,
one or more quality of service (QOS) requirements associated with the first network node,
a latency requirement or a deadline associated with one or more packets to be transmitted on the sidelink channel by the first network node, or
a number of sidelink connections associated with the first network node.

6. The first network node of claim 1, wherein the one or more processors are configured to:
receive, on an access link, information that indicates the first sidelink DRX priority assigned to the first network node from a serving network node.

7. The first network node of claim 1, wherein the one or more processors are configured to:
transmit, to a third network node in communication with the first network node on the sidelink channel, assistance information that indicates the first sidelink DRX priority assigned to the first network node.

8. The first network node of claim 1, wherein the one or more processors are configured to:
receive, from a third network node in communication with the first network node on the sidelink channel, assistance information that indicates a sidelink DRX priority assigned to the third network node; and
forward, to a serving network node, the assistance information.

9. The first network node of claim 1, wherein to determine the first sidelink DRX priority assigned to the first network node, the one or more processors are configured to determine the first sidelink DRX priority based on the first network node not having an access link connection to a serving network node.

10. The first network node of claim 1, wherein the one or more processors are configured to:
receive, on the sidelink channel from a relay network node, information that indicates the first sidelink DRX priority assigned to the first network node based on the first network node not having an access link connection to a serving network node.

11. The first network node of claim 1, wherein the one or more processors are configured to:
receive, on an access link from a serving network node, information that indicates a third sidelink DRX priority assigned to a third network node in communication with the first network node on the sidelink channel based on the third network node not having an access link connection; and
forward, on the sidelink channel to the third network node, the information that indicates the third sidelink DRX priority assigned to the third network node.

12. A method of wireless communication performed by a first network node, comprising:
determining a first sidelink discontinuous reception (DRX) priority assigned to the first network node, wherein the first sidelink DRX priority is based on one or more criteria associated with the first network node; and
communicating on a sidelink channel using a first set of one or more DRX configurations based on the first sidelink DRX priority assigned to the first network node, wherein the first set of one or more DRX configurations are at least partially aligned in time with a second set of one or more DRX configurations of a second network node assigned a second sidelink DRX priority, wherein the second sidelink DRX priority is equivalent to the first sidelink DRX priority.

13. The method of claim 12, further comprising:
adjusting the first set of one or more DRX configurations to be at least partially aligned in time with a DRX configuration of a third network node assigned a third sidelink DRX priority that is higher than the first sidelink DRX priority.

14. The method of claim 13, wherein adjusting the first set of one or more DRX configurations includes adding, before or after a first ON-duration that is based on the first sidelink DRX priority, a second ON-duration that is aligned with the DRX configuration of the third network node.

15. The method of claim 13, wherein adjusting the first set of one or more DRX configurations includes replacing an ON-duration that is based on the first sidelink DRX priority with an ON-duration that is aligned with the DRX configuration of the third network node.

16. The method of claim 12, wherein the one or more criteria include at least one of: a power consumption constraint associated with the first network node, one or more quality of service (QOS) requirements associated with the first network node, a latency requirement or a deadline associated with one or more packets to be transmitted on the sidelink channel by the first network node, or a number of sidelink connections associated with the first network node.

17. The method of claim 12, further comprising:
receiving, on an access link, information that indicates the first sidelink DRX priority assigned to the first network node from a serving network node.

18. The method of claim 12, further comprising:
transmitting, to a third network node in communication with the first network node on the sidelink channel, assistance information that indicates the first sidelink DRX priority assigned to the first network node.

19. The method of claim 12, further comprising:
receiving, from a third network node in communication with the first network node on the sidelink channel, assistance information that indicates a sidelink DRX priority assigned to the third network node; and forwarding, to a serving network node, the assistance information.

20. The method of claim 12, wherein determining the first sidelink DRX priority assigned to the first network node is performed by the first network node based on the first network node not having an access link connection to a serving network node.

21. The method of claim 12, further comprising:
receiving, on the sidelink channel from a relay network node, information that indicates the first sidelink DRX priority assigned to the first network node based on the first network node not having an access link connection to a serving network node.

22. The method of claim 12, further comprising:
receiving, on an access link from a serving network node, information that indicates a third sidelink DRX priority assigned to a third network node in communication with the first network node on the sidelink channel based on the third network node not having an access link connection; and forwarding, on the sidelink channel to the third network node, the information that indicates the third sidelink DRX priority assigned to the third network node.

23. A non-transitory computer-readable medium having code stored thereon that, when executed by one or more processors of a first network node, causes the first network node to:
determine a first sidelink discontinuous reception (DRX) priority assigned to the first network node, wherein the first sidelink DRX priority is based on one or more criteria associated with the first network node; and
communicate on a sidelink channel using a first set of one or more DRX configurations based on the first sidelink DRX priority assigned to the first network node, wherein the first set of one or more DRX configurations are at least partially aligned in time with a second set of one or more DRX configurations of a second network node assigned a second sidelink DRX priority, wherein the second sidelink DRX priority is equivalent to the first sidelink DRX priority.

24. The non-transitory computer-readable medium of claim 23, wherein the code, when executed by the one or more processors of the first network node, causes the first network node to:
adjust the first set of one or more DRX configurations to be at least partially aligned in time with a DRX configuration of a third network node assigned a third sidelink DRX priority that is higher than the first sidelink DRX priority.

25. The non-transitory computer-readable medium of claim 23, wherein the one or more criteria include at least one of:
a power consumption constraint associated with the first network node,
one or more quality of service (QOS) requirements associated with the first network node,
a latency requirement or a deadline associated with one or more packets to be transmitted on the sidelink channel by the first network node, or
a number of sidelink connections associated with the first network node.

26. The non-transitory computer-readable medium of claim 23, wherein the code, when executed by the one or more processors of the first network node, causes the first network node to:
receive, on an access link, information that indicates the first sidelink DRX priority assigned to the first network node from a serving network node.

27. The non-transitory computer-readable medium of claim 23, wherein the code, when executed by the one or more processors of the first network node, causes the first network node to:
transmit, to a third network node in communication with the first network node on the sidelink channel, assistance information that indicates the first sidelink DRX priority assigned to the first network node.

28. The non-transitory computer-readable medium of claim 23, wherein the code, when executed by the one or more processors of the first network node, causes the first network node to:
receive, from a third network node in communication with the first network node on the sidelink channel, assistance information that indicates a sidelink DRX priority assigned to the third network node; and
forward, to a serving network node, the assistance information.

29. The non-transitory computer-readable medium of claim 23, wherein the first sidelink DRX priority is based on the first network node not having an access link connection to a serving network node.

30. The non-transitory computer-readable medium of claim 23, wherein the code, when executed by the one or more processors of the first network node, causes the first network node to:
receive, on the sidelink channel from a relay network node, information that indicates the first sidelink DRX priority assigned to the first network node based on the first network node not having an access link connection to a serving network node.

* * * * *